US012593002B2

(12) United States Patent
Abe et al.

(10) Patent No.: US 12,593,002 B2
(45) Date of Patent: Mar. 31, 2026

(54) CONTROL APPARATUS, CONTROL METHOD, AND STORAGE MEDIUM

(71) Applicant: CANON KABUSHIKI KAISHA, Tokyo (JP)

(72) Inventors: Seiji Abe, Kanagawa (JP); Mitsuru Uratani, Kanagawa (JP); Kouta Murasawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 248 days.

(21) Appl. No.: 18/300,325

(22) Filed: Apr. 13, 2023

(65) Prior Publication Data

US 2023/0347673 A1 Nov. 2, 2023

(30) Foreign Application Priority Data

Apr. 27, 2022 (JP) ................................. 2022-073724

(51) Int. Cl.
| | |
|---|---|
| *H04N 1/60* | (2006.01) |
| *B41M 3/06* | (2006.01) |
| *H04N 1/54* | (2006.01) |

(52) U.S. Cl.
CPC ............ *H04N 1/6038* (2013.01); *B41M 3/06* (2013.01); *H04N 1/54* (2013.01); *H04N 1/6041* (2013.01); *H04N 1/6086* (2013.01)

(58) Field of Classification Search
CPC ...... H04N 1/6038; H04N 1/54; H04N 1/6041; B41M 3/06
See application file for complete search history.

(56) References Cited

U.S. PATENT DOCUMENTS

| | | | |
|---|---|---|---|
| 2009/0284812 A1* | 11/2009 | Tsukamoto .......... | H04N 1/6033 358/518 |
| 2011/0116137 A1 | 5/2011 | Uratani et al. ........... | H04N 1/40 |
| 2011/0149319 A1* | 6/2011 | Muto ................... | H04N 1/6033 358/1.9 |
| 2011/0164287 A1* | 7/2011 | Baba .................... | H04N 1/6033 358/3.24 |

(Continued)

FOREIGN PATENT DOCUMENTS

JP 2014-136413 7/2014

OTHER PUBLICATIONS

U.S. Appl. No. 18/340,724, filed Jun. 23, 2023.

*Primary Examiner* — Nicholas Pachol
(74) *Attorney, Agent, or Firm* — Venable LLP

(57) ABSTRACT

A control apparatus that functions as a control unit controlling printing of a fluorescent material patch on a printing medium, an estimation unit to estimate a discharge amount of the fluorescent material based on a reflection intensity obtained by receiving light reflected by the patch on the printing medium, and a correction unit to correct a printing amount of the fluorescent material based on an estimation result. The patch is printed using the fluorescent material and a non-fluorescent material, and at least one dot of the non-fluorescent material overlaps a dot of the fluorescent material. A luminous wavelength of a fluorescent whitening agent contained in the printing medium is an excitation wavelength of the fluorescent material, and the non-fluorescent material absorbs at least one of light in an excitation wavelength range of the fluorescent whitening agent or light in a luminous wavelength range of the fluorescent whitening agent.

20 Claims, 19 Drawing Sheets

(56) References Cited

U.S. PATENT DOCUMENTS

| | | | | |
|---|---|---|---|---|
| 2011/0255105 A1* | 10/2011 | Hatori | H04N 1/6033 | 358/1.9 |
| 2012/0043751 A1* | 2/2012 | Hersch | G07D 7/1205 | 101/212 |
| 2014/0036282 A1* | 2/2014 | Tyagi | H04N 1/54 | 358/1.9 |
| 2014/0037306 A1* | 2/2014 | Kuo | G03G 15/6585 | 399/39 |
| 2014/0037307 A1* | 2/2014 | Kuo | H04N 1/6066 | 358/1.9 |
| 2014/0037338 A1* | 2/2014 | Tyagi | G03G 15/6585 | 399/252 |
| 2014/0320927 A1* | 10/2014 | Kuo | H04N 1/54 | 358/2.1 |
| 2017/0247560 A1* | 8/2017 | Watanabe | B41M 5/00 | |
| 2017/0359485 A1* | 12/2017 | Shimada | H04N 1/6019 | |
| 2020/0007695 A1 | 1/2020 | Kagawa et al. | H04N 1/00 | |
| 2020/0296243 A1* | 9/2020 | Aoyagi | G06T 7/13 | |
| 2021/0142130 A1 | 5/2021 | Uratani | G06K 15/02 | |
| 2021/0144276 A1* | 5/2021 | Maheshwari | H04N 1/6033 | |
| 2021/0218865 A1 | 7/2021 | Tsuchiya et al. | H04N 1/64 | |
| 2022/0174185 A1* | 6/2022 | Takamizawa | H04N 1/6033 | |
| 2022/0250394 A1* | 8/2022 | Mizoguchi | H04N 1/6008 | |
| 2022/0250395 A1* | 8/2022 | Tsuchiya | B41J 2/2132 | |
| 2022/0253655 A1* | 8/2022 | Abe | H04N 1/6033 | |
| 2022/0358777 A1 | 11/2022 | Mizoguchi et al. | G06V 30/19 | |
| 2023/0124689 A1 | 4/2023 | Yamada et al. | H04N 1/60 | |
| 2023/0286288 A1* | 9/2023 | Mochizuki | H04N 1/405 | |
| 2025/0117611 A1* | 4/2025 | Kubo | G06K 15/1852 | |

* cited by examiner 501  503  504

502

SCAN

CONVEYANCE OF SHEET

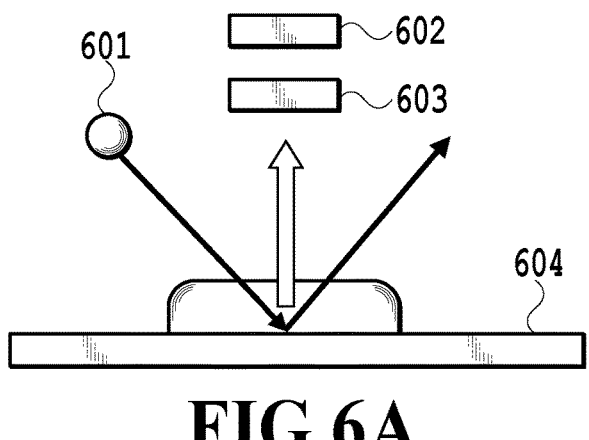
FIG.6A
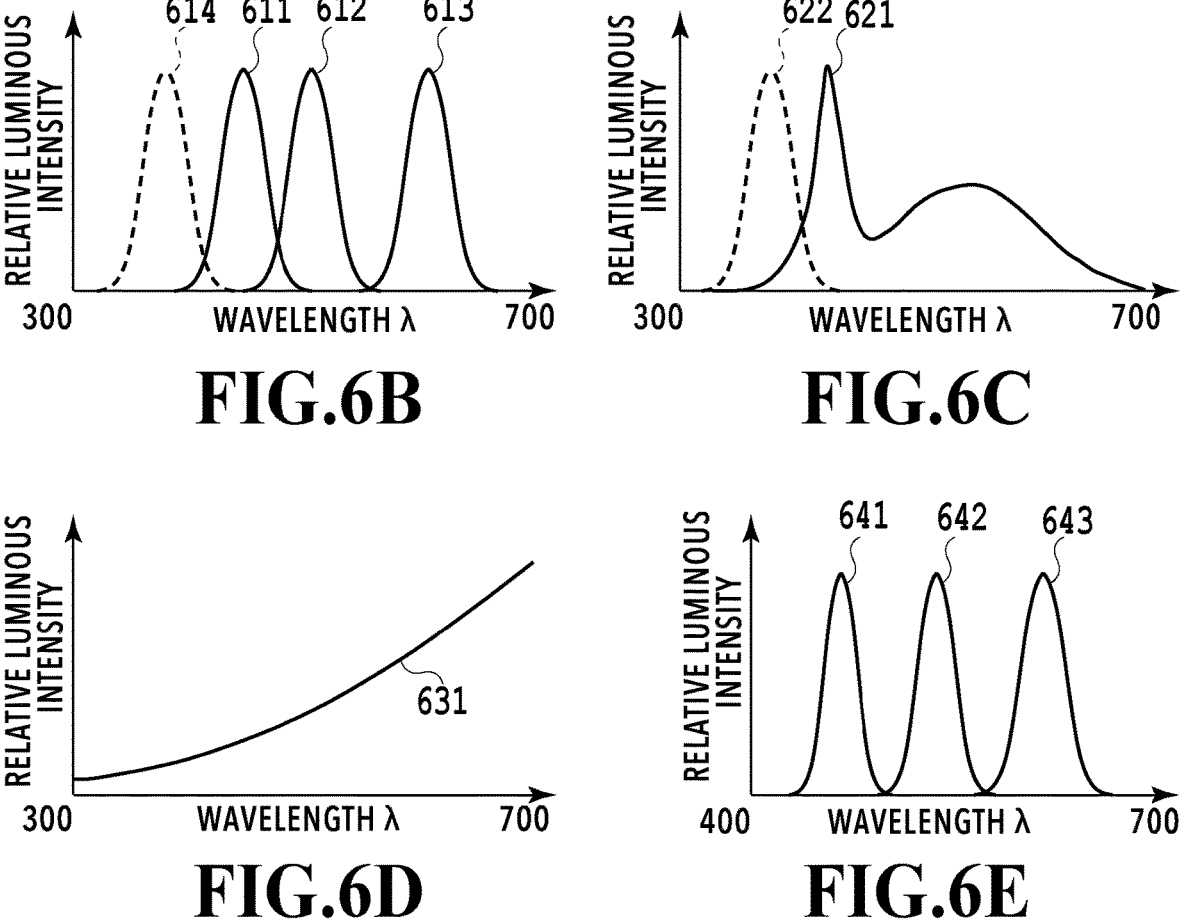
FIG.6B          FIG.6C
FIG.6D          FIG.6E

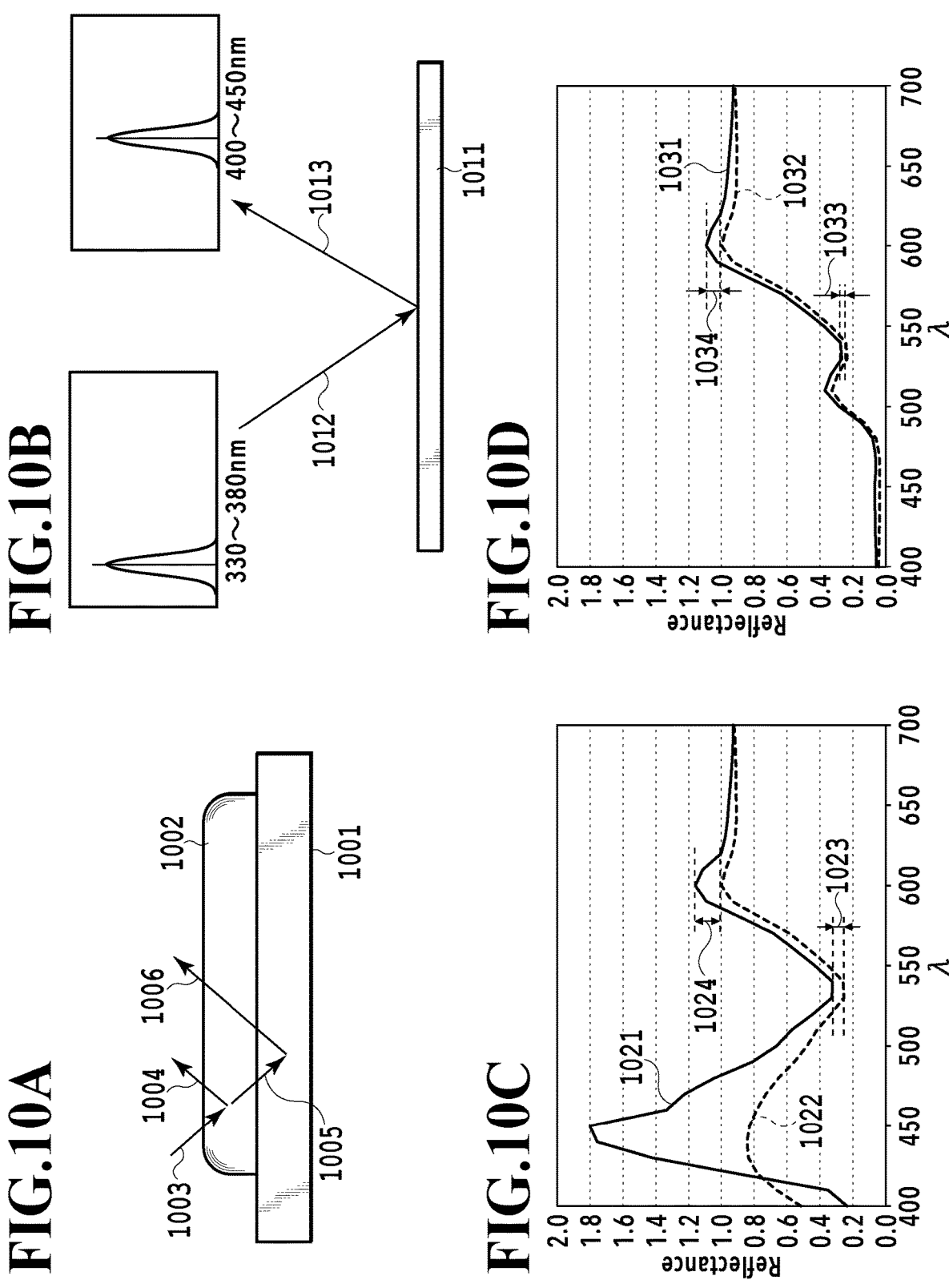

CONTROL APPARATUS, CONTROL METHOD, AND STORAGE MEDIUM

CROSS REFERENCE TO PRIORITY APPLICATION

This application claims the benefit of Japanese Patent Application No. 2022-073724, filed Apr. 27, 2022, which is hereby incorporated by reference herein in its entirety.

BACKGROUND

Field

The present disclosure relates to color calibration.

Description of the Related Art

Heretofore, color calibration has been known that involves reading a printed patch with a measurement device, estimating a discharge amount from the density thus read, and changing the amount of an ink to be discharged according to the estimation result so that the printing apparatus' color density matches those of others.

There are mainly two types of measurement devices for use in the color calibration. One is a spectrocolorimeter, which receives light separated by using a white light source having wavelengths in ultraviolet (UV) and visible light ranges and a diffraction grating to thereby obtain a color's density or color value (e.g., CIE L*a*b*, tristimulus values XYZ, or the like). The other one is a density sensor. There are two methods of using the density sensor. One is a method in which red, green, and blue density characteristics are obtained by obtaining reflection coefficients with a light source having predetermined wavelength bandwidths (e.g., a light emitting diode (LED) light source having a peak in each of red, green, and blue wavelength ranges) and a light-sensitive element (e.g., a photodiode). The other one is a method using a white light source (e.g., an LED having a spectral distribution in a visible light range, or the like) and an optical filter in front of a light-sensitive element (e.g., an optical filter having a spectral sensitivity distribution in a red, green, or blue wavelength range, or the like). In this method, density characteristics are obtained by obtaining the reflection coefficients of separated red, green, and blue light beams.

Whether the measurement device used is a spectrocolorimeter or a density sensor, attention is required in a case of using a light source that emits light including UV light, such as a white light source, as the light source of the measurement device in calibration utilizing a patch of a fluorescent ink printed on a sheet containing a fluorescent whitening agent. The reason is that the amount of light emission by the fluorescent whitening agent contained in the sheet varies due to unevenness of the fluorescent whitening agent, making it difficult to determine whether a change in the measured value of the measurement device originates from a change in the discharge amount of the ink or from the unevenness of the fluorescent whitening agent.

Japanese Patent Laid-Open No. 2014-136413 discloses a method as a technology for color calibration of a fluorescent ink in which actually measured density detected by an optical sensor is corrected according to fluorescence information of the ink, and a color discrepancy correction table is created according to density characteristics based on the visual sense. Specifically, a correction in which a weight based on the visual sense is applied to actually measured density is performed.

SUMMARY

Nonetheless, even if the printer's discharge amount of the ink does not change, the measured value of the measurement device changes due to the unevenness of the fluorescent whitening agent contained in the sheet, as mentioned above. Consequently, the unevenness of the fluorescent whitening agent may be erroneously determined as a change in the discharge amount.

In particular, in a case when the calibration target is a fluorescent ink, a change in the amount of light emission of the fluorescent whitening agent facilitates a change in the amount of light emission of the fluorescent ink. Thus, the influence on the measured value is more complicated. This leads to a problem that, even if a weight based on visual sense characteristics is applied to the reading value of a sensor as in Japanese Patent Laid-Open No. 2014-136413, it does not enhance the reading accuracy of the sensor and lowers the accuracy of the calibration correction.

In view of the above problem, an object of the present disclosure is to accurately perform color calibration of a printing apparatus that performs printing with a fluorescent material regardless of unevenness of a fluorescent whitening agent contained in the sheet.

An embodiment of the present invention is a control apparatus including a control unit that controls printing of a patch on a printing medium, the patch being formed by printing a fluorescent material, and a correction unit that corrects a printing amount of the fluorescent material based on a measurement result obtained by receiving light reflected by the printing medium on which the patch is printed, in which the patch is printed using the fluorescent material and a non-fluorescent material, and at least one dot of the non-fluorescent material overlaps a dot of the fluorescent material.

Further features of the present invention will become apparent from the following description of exemplary embodiments with reference to the attached drawings.

BRIEF DESCRIPTION OF THE DRAWINGS

FIGS. 6A to 6E are a diagram and charts explaining the sensor unit;

FIGS. 10A to 10D are diagrams and charts for explaining cases of measuring a sample obtained by printing a fluorescent ink on a sheet containing a fluorescent whitening agent;

DESCRIPTION OF THE EMBODIMENTS

Embodiments of the present disclosure will be described below using the drawings. While there are several methods to perform color calibration, the following two are common ones.

The first one is a method involving printing solid-color gradation patches and generating a table for correcting ink amounts such that the density of each gradation patch matches a target density. The second one is a method involving estimating a discharge amount from the density of at least one printed patch, and selecting a correction table corresponding to the estimated discharge amount from among prestored correction tables. The above correction tables each refer to a table for changing an ink amount (the number of dots, the dot diameter, or the like) in which the ink is to be printed (see FIG. 3C). The following will describe examples using the gradation patches in the first method.

First Embodiment

<Image Processing Unit of Printing Apparatus>

A printing apparatus having an image processing unit in a first embodiment will be described below. Specifically, an inkjet printer (hereafter also referred to simply as "printer") will be assumed as the printing apparatus. The printer includes therein a color sensor including a white light source for measuring a printed patch chart and a photodiode as a light-sensitive element. The printer is capable of printing any patch chart and measuring the printed patch chart with this color sensor. The printer is also capable of functioning simply as a printing apparatus and executing print processing based on print target data such as a document or an image processed by various pieces of software.

The printer holds inks of six colors of cyan (C), magenta (M), yellow (Y), black (K), fluorescent pink (FP), and green (G) as color materials. The ink combination is not limited to the above. For example, the printer may hold a combination of inks of spot colors such as red (R), orange (Or), blue (B), and gray (Gy) or hold inks of light cyan (Lc) obtained by diluting a cyan (C) ink and of light magenta (Lm) obtained by diluting a magenta (M) ink. Instead of the fluorescent pink (FP) ink, a fluorescent blue (FB) ink or a fluorescent yellow (FY) ink may be used.

<Components Involved in Color Conversion Processing>

Figure 1:
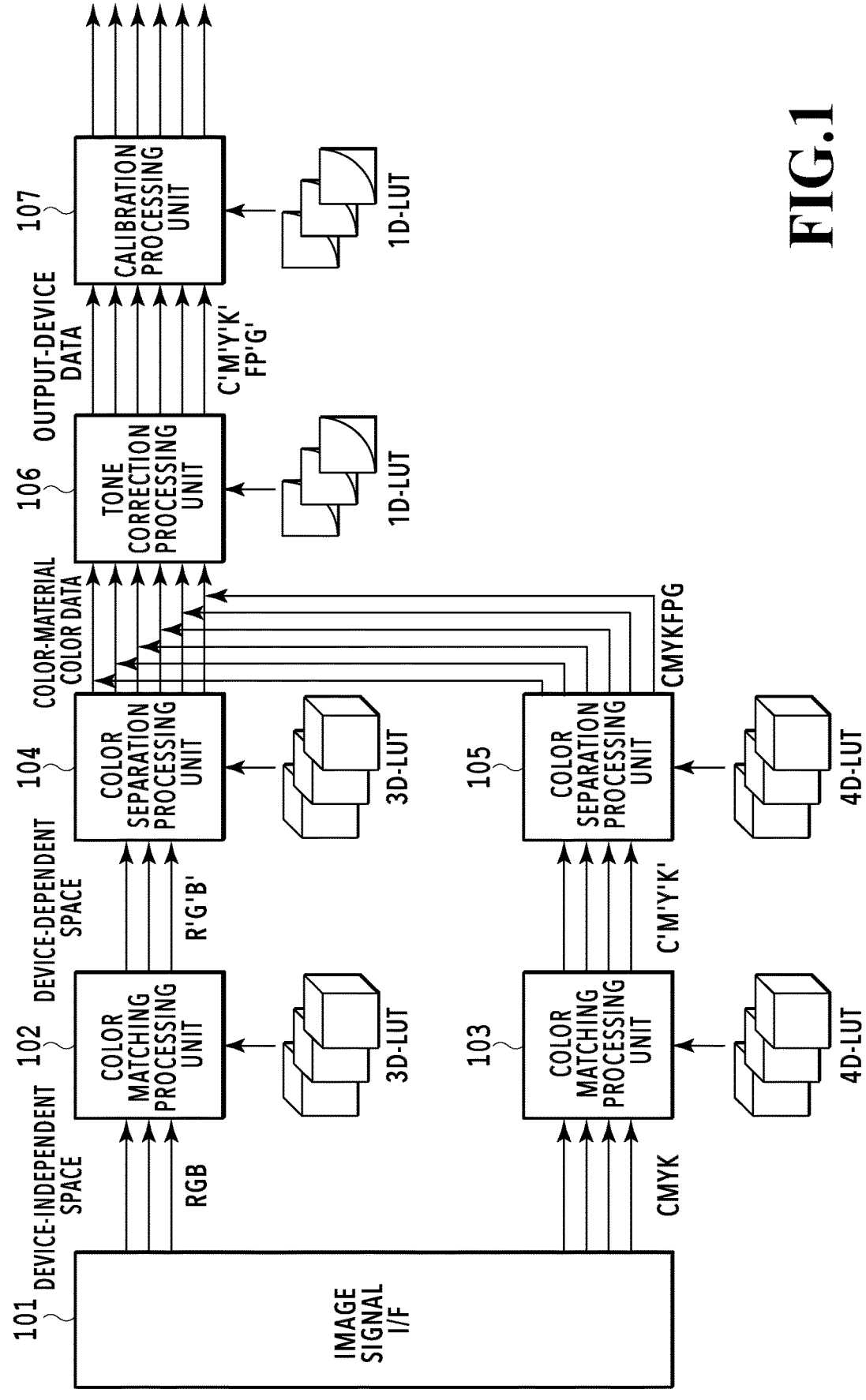
FIG. 1 is a block diagram illustrating components of an image processing unit involved in color conversion processing.

FIG. 1 is a block diagram illustrating components of the image processing unit in the present embodiment involved in color conversion processing. Incidentally, the printer in the present embodiment has functionality of an RGB printer into which RGB signals are input and functionality of a CMYK printer into which CMYK signals are input. Also, for convenience of description, image data is processed as 8-bit signal values for each color. It is, however, needless to say that similar advantageous effects can be accomplished also in a case where the pixel value of each pixel in image data is expressed with a larger number of bits, such as 10 bits, 12 bits, or 16 bits.

An image signal interface (I/F) 101 is an I/F unit for input image data. In the present embodiment, RGB-signal image data and CMYK-signal image data are input into the image signal interface (I/F) 101. A color matching processing unit

102 performs conversion processing of converting color data in a device-independent space into color data in a device-dependent space on RGB-signal image data. Similarly, a color matching processing unit 103 performs conversion processing of converting color data in a device-independent space into color data in a device-dependent space on CMYK-signal image data.

A color separation processing unit 104 performs color separation processing of converting color data in a device-dependent space into color-material color data on the image data output from the color matching processing unit 102. Similarly, a color separation processing unit 105 performs color separation processing of converting color data in a device-dependent space into color-material color data on the image data output from the color matching processing unit 103.

A tone correction processing unit 106 performs tone correction processing of adjusting color-material color data to output characteristics of the printer on the pieces of color-material color data output from the color separation processing units 104 and 105.

The color matching processing units 102 and 103 and the color separation processing units 104 and 105 are each capable of executing a desired color conversion on the input image data by setting a dedicated lookup table (hereinafter referred to as "LUT"). The LUT used here is provided and managed for each of types of printing media and for each of printing modes such as high-speed printing and low-speed high-quality printing.

Of the above processing units, the color matching processing unit 102 and the color separation processing unit 104 each perform the corresponding color conversion processing by using a 3D-LUT. The color matching processing unit 103 and the color separation processing unit 105 each perform the corresponding color conversion processing by using a 4D-LUT. The tone correction processing unit 106 performs the corresponding color conversion processing by using a 1D-LUT. Specifically, the 3D-LUTs used by the color matching processing unit 102 and the color separation processing unit 104 are each a 3D-LUT including 16 grid points at intervals of 17 counts for each color, or 16×16×16=4096 grid points.

As illustrated in FIG. 1, the image processing unit has a calibration processing unit 107. The calibration processing unit 107 corrects the variations in the colors of printed products which would otherwise occur due to individual differences of constituent devices of the printer, the printing medium, the color materials, and so on, the variation in discharge amount due to temporal change of the devices, and so on. Specifically, the calibration processing unit 107 performs a process using a 1D-LUT for each color-material color signal. The reason for performing this process is to adjust the density values of the printing unit of an actually used apparatus for input data values to calibration target values which are the density values of the printing unit of a base apparatus (for the production line) for the input values.

In the present embodiment, a configuration in which the printing apparatus has the image processing unit is illustrated, but the image processing unit may be provided to be separate from the printing apparatus. For example, an information processing apparatus such as a personal computer may function as the image processing unit.

<Patch Chart>

Figure 2:
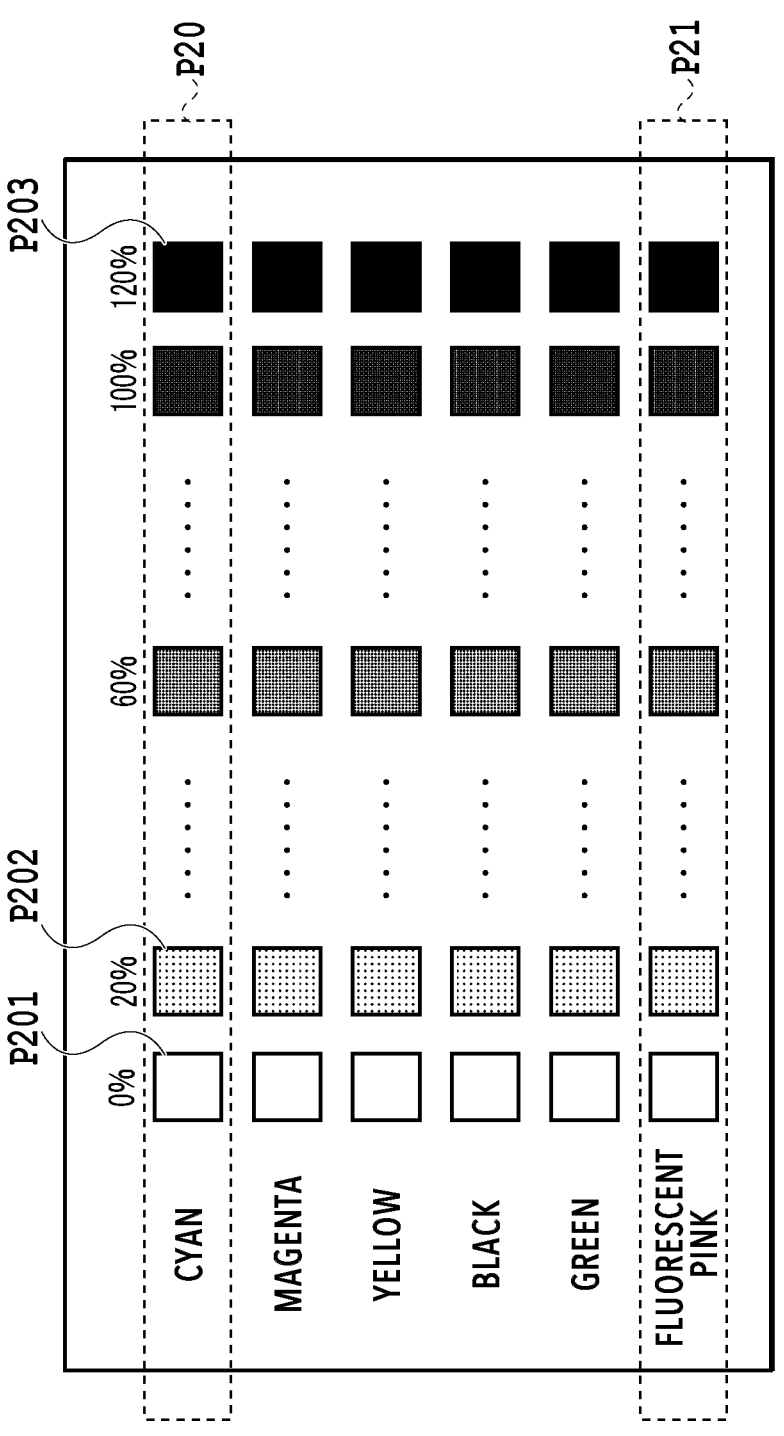
FIG. 2 is a diagram illustrating a patch chart.

FIG. 2 illustrates a patch chart for measuring the density values obtained by actual printing of predetermined input data values as a print product by a printing apparatus actually used at the time of executing calibration. This patch
chart has a plurality of patches for each ink.

Cyan, magenta, yellow, black, and green patches are
obtained using the inks of the respective color materials with
input signals of the respective color materials' colors
changed at 20% intervals. By measuring the colors of the
patch chart thus printed, discharge amounts corresponding
to the printer's color materials can be estimated. For
example, cyan patches P20 are printed only with the cyan
ink, and a patch P201 is printed with an application amount
of cyan 0%, a patch P202 is printed with an application
amount of cyan 20%, and a patch P203 is printed with an
application amount of cyan 120%.

Unlike the above, fluorescent pink patches are printed
using the fluorescent pink color material with the input
signal changed at 20% intervals and the yellow color mate-
rial with the input signal fixed at a given value. That is,
fluorescent pink patches P21 illustrated in FIG. 2 are printed
with the fluorescent pink and the yellow ink.

<Execution of Calibration>

Figures 3A, 3B, 3C:
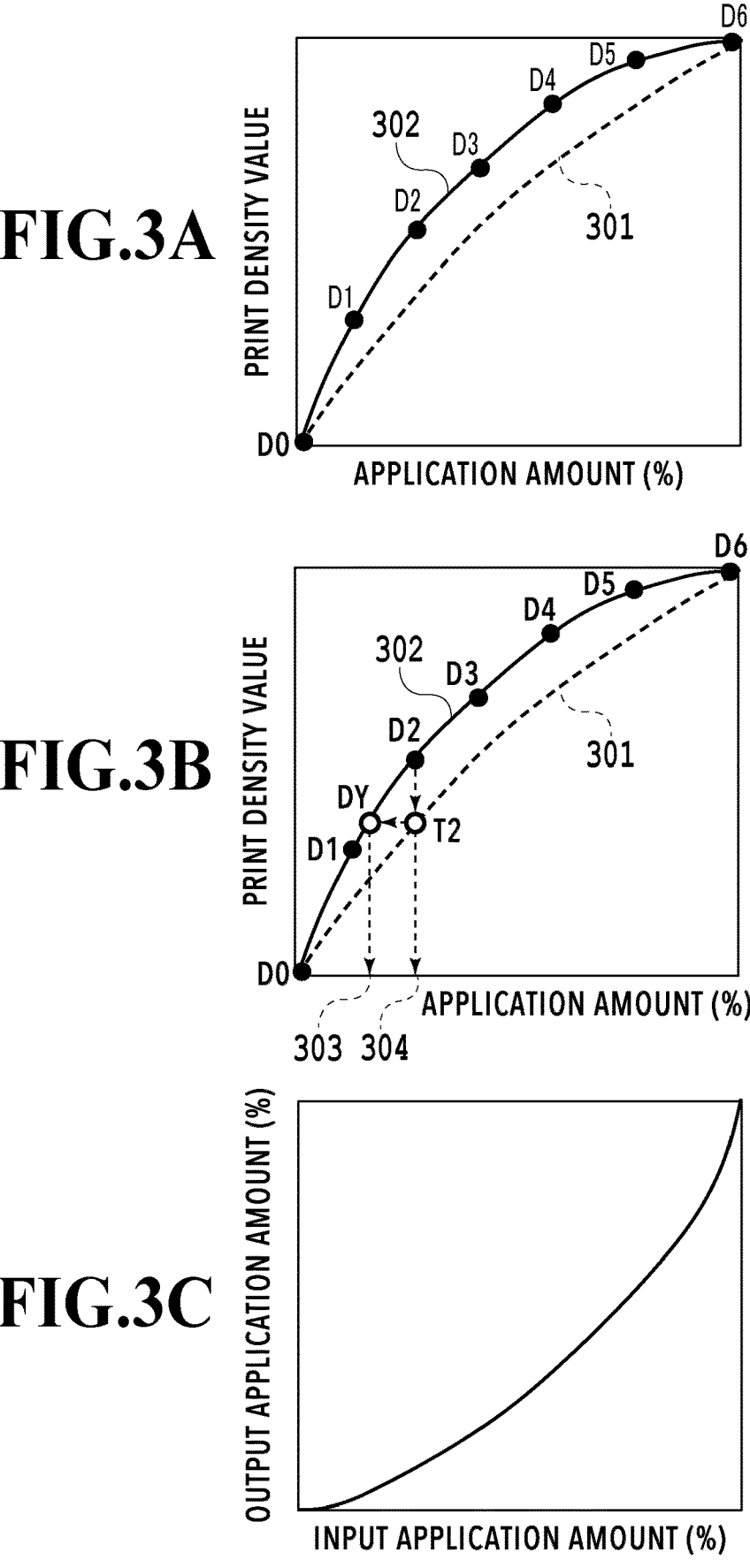
FIGS. 3A to 3C are charts explaining 1D-LUT data.

FIG. 3A is a chart for explaining 1D-LUT data used by the
calibration processing unit 107 in FIG. 1. FIG. 3A illustrates
an example with one kind of ink on a given medium. The
vertical axis represents the print density value of the printing
unit read by the sensor, and the horizontal axis represents the
application amount (%) applied to print a patch.

"Application amount" refers to the ratio of the number of
ink dots to be printed on a sheet surface. The following
description will be given taking an inkjet printer with a
resolution of 1200 dpi×1200 dpi as an example of the
printing apparatus. In a case when an area to print a single
dot measuring 1200 dpi×1200 dpi is defined as a single grid
cell, 100% refers to a state where a single dot is printed in
every single one of a plurality of grid cells. Also, 200%
refers to a state where two dots are printed in every grid cell
measuring 1200 dpi×1200 dpi (a state where the number of
dots printed is twice as many as with 100%). Incidentally,
the position to print a dot does not necessarily have to be the
center of the grid cell, and a dot may be printed between grid
cells.

The density value for an application amount of X % can
be defined as $$D(X)=-\log(P(X)/P(0)) \qquad \text{Equation 1,}$$

where P(X) is a reflection coefficient output by the sensor,
and P(0) is the reflection coefficient of a patch at a paper
white area.

In a case of printing with an ink mixed in a fixed
application amount of C %, the density value can be defined
as $$D(X)=-\log(P(X)/P(C)) \qquad \text{Equation 2,}$$

where P(C) is the reflection coefficient of the ink mixed in
the fixed application amount of C %.

The curve indicated by a dashed line 301 in FIGS. 3A and
3B is a set of print density values of a color material obtained
with the base apparatus for a set of input data values, and
represents a set of calibration target values. The base appa-
ratus is a printer that serves as a base and whose discharge
amount is set as a reference amount for variations in the
discharge amounts of actually used apparatuses. Information
on such calibration target values is prestored in a storage unit
of each printer in a system.

The curve indicated by a solid line 302 represents the print
density value of the color material obtained with an actually
used apparatus. An actually used apparatus is a printer to be
subjected to calibration. This information can be obtained by printing the patch chart in FIG. 2 and reading the printed
patch chart with the sensor. D0 to D6 represent densities
(calculated by Equation 1) corresponding to patches
arranged at 20% intervals from 0% to 120% in the patch
chart. The solid line 302 is derived based on the measured
values of D0 to D6 by using interpolation processing, an
approximating curve, or the like.

As indicated by the printing state of the actually used
apparatus in FIG. 3A, the actually used apparatus generally
discharges the color material in a larger amount than the
base apparatus, and the printing density is higher than that
of the reference apparatus particularly in an intermediate
density range. The correction by the calibration processing
unit 107 is to convert and to correct a contone color material
signal of each color material's color so as to achieve the
printing density as obtained with the base apparatus. The
calibration processing unit 107 performs the correction
processing by using a correction parameter. Calculation of
this correction parameter will be described using FIG. 3B.

A plot point D2 in FIG. 3B represents the density value of
a patch printed by an actually used apparatus with an
application amount of 40% in the patch chart in FIG. 2. This
value is higher than a target density value indicated by a plot
point T2 at the same application amount. Thus, it is neces-
sary to adjust the density value of the actually used apparatus
to the target density value by reducing the application
amount. Specifically, to what application amount of the
actually used apparatus the density value at T2 corresponds
is figured out by searching the solid line 302 and finding a
point DY That is, in a case when the actually used apparatus
is used to perform printing with an application amount 303
indicated by the point DY, the print density value will be
substantially equal to the target density value.

The processing for the plot point D2 described above is
performed on all of the plot points D0 to D6, and then
interpolation processing, an approximating curve, or the
like, is used. As a result, a 1D-LUT data as illustrated in FIG.
3C is generated which represents a relation between input
application amounts (%) and output application amounts
(%). The 1D-LUT is discrete values at, for example, 256
points or 1024 points or a correction parameter in a math-
ematical equation that can be defined with a curve or the
like.

<Configuration of Printing System>

Figure 4:
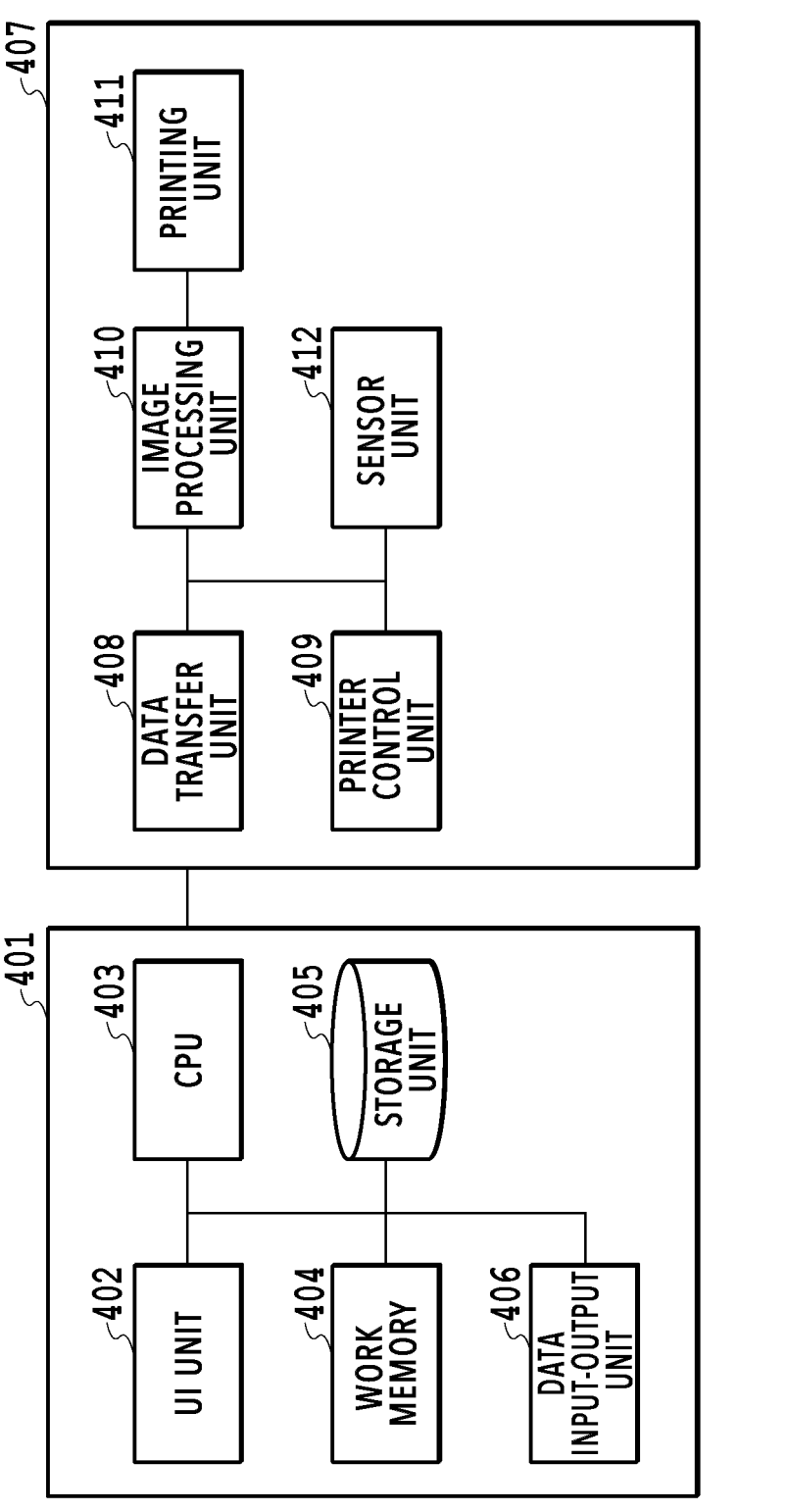
FIG. 4 is a configuration diagram of a printing system.

FIG. 4 is a block diagram illustrating a configuration of a
printing system in the present embodiment. The printing
system has a personal computer (hereafter also referred to
simply as "PC") 401 as an information processing apparatus,
and a printer 407 as a printing apparatus. The PC 401 and the
printer 407 are connected to each other through a network
and interfaces, such as universal serial bus (USB) ports and
local buses.

The PC 401 performs processes as described below
related to controlling of the printer 407 according to various
software programs. A storage unit 405 stores a system
program, application software programs, a software pro-
gram necessary for printing operations, and software pro-
grams necessary for the processes to be described below.
The storage unit 405 also stores various image processing
parameters, mechanical parameters, printer control data, and
sensor-unit control data as well as necessary programs,
various pieces of data, and print target data created on the PC
401. The storage unit 405 is represented by a hard disk drive
and a flash read only memory (ROM). A central processing
unit (CPU) 403 executes predetermined processes according
to various programs and various pieces of data stored in the
storage unit 405 with a work memory 404 as a work area.

A data input-output unit 406 is a portable storage device as represented by a compact disc (CD), a digital versatile disc (DVD), a USB flash drive, and the like, or a data communication device as represented by a local area network (LAN) card, and is used as an interface to external apparatuses or devices.

A user interface (hereafter also referred to as "UI") unit 402, which is a user operation unit, performs processes related to inputting from users and outputting (such as displaying) to users, and includes input equipment such as a keyboard and a mouse and display equipment such as a display.

The printer 407 has a data transfer unit 408, a printer control unit 409, an image processing unit 410, a printing unit 411, and a sensor unit 412, and performs print processing based on print data transmitted from the PC 401. This print data contains control data for the sensor unit 412, and the printer 407 measures a printed material by using the control data. The data transfer unit 408 takes image data and image processing parameters out of the print data transmitted from the PC 401 and transmits them to the image processing unit 410, and takes mechanical parameters, printer control data, and sensor-unit control data out of the print data and transmits them to the printer control unit 409. The data transfer unit 408 also reads information on the results of printing, sensor measurement, and so on, stored in the storage unit in the printer out of the storage unit, and transmits the read information to the PC 401. The printer control unit 409 includes a CPU, a ROM, a random-access memory (RAM), and the like, and controls the printing operation of the printer 407 according to the printer control data transmitted from the data transfer unit 408. The printer control unit 409 also controls measurement with the sensor unit 412 in addition to the printing operation control.

<Color Sensor>

Figure 5:
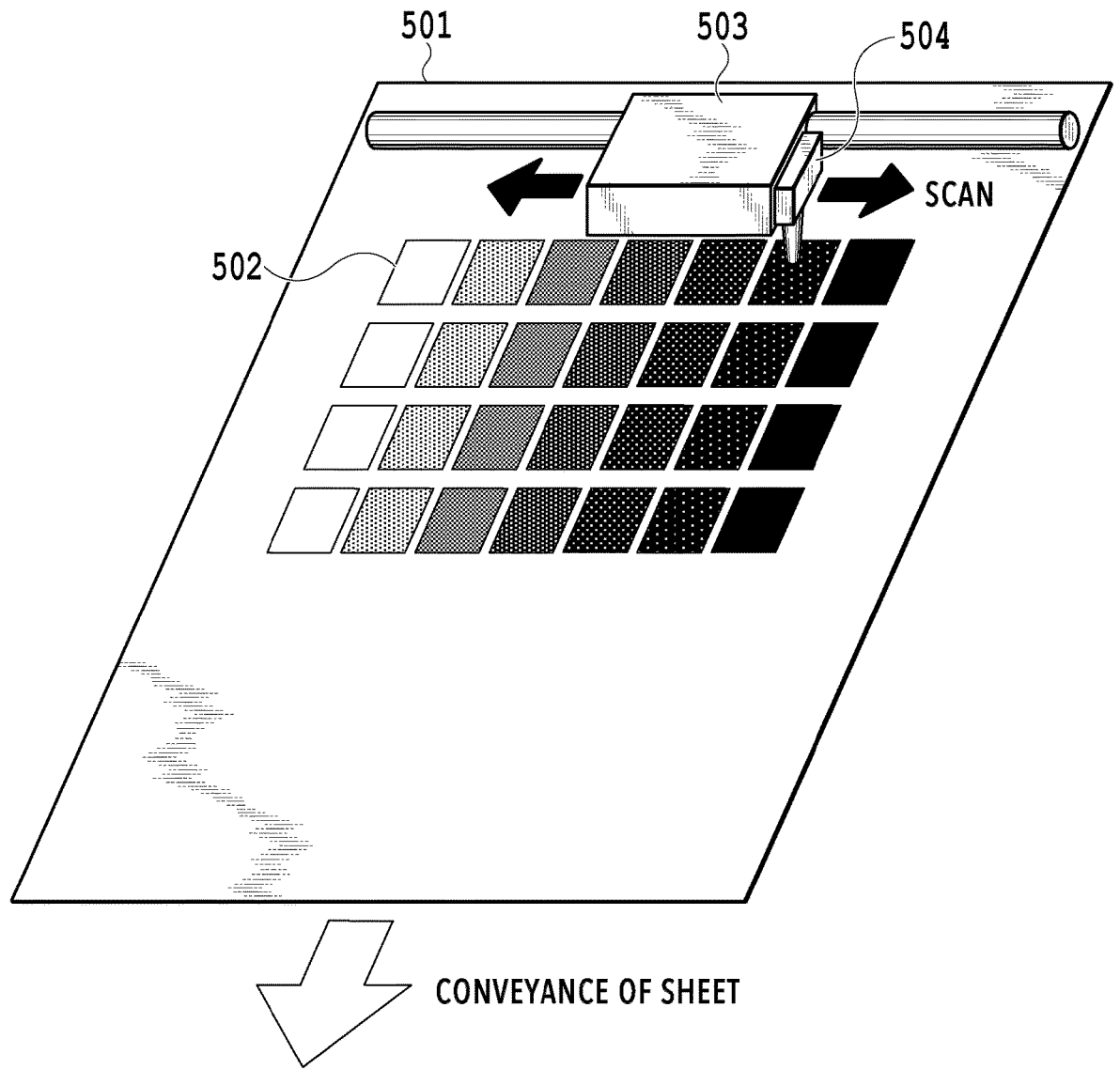
FIG. 5 is a diagram illustrating reading of a patch chart by a sensor unit.

FIG. 5 illustrates an example configuration of the sensor unit 412 in the printer 407. A carriage 503 forms patch images 502 by discharging an ink while being scanned leftward and rightward over a sheet 501. A sensor member 504 is mounted on a side of the carriage 503.

<Light Source of Color Sensor and Optical Filter of Light-Sensitive Sensor>

FIG. 6A illustrates a schematic configuration of the sensor unit. The sensor unit has a white light source 601 that emits light including UV light, and a light-sensitive element 602 that receives the light reflected by a printed material 604. The sensor unit also has an optical filter 603 provided in front of the light-sensitive element 602. This optical filter is used for two purposes.

One is to select a complementary color and receive light of wavelengths in a wide density identification range. Specifically, measurement is performed with a red filter selected for cyan and green, a green filter selected for magenta, fluorescent pink, and black, and a blue filter selected for yellow.

The other is to, in a case of applying light to a fluorescent ink, or the like, separately receive light with the excitation wavelength at which the applied light is absorbed, and emitted light in a longer wavelength range than the wavelength range in which the light is absorbed.

The following are three examples of the white light source.

The first example is LEDs each having a peak in a red, green, blue, or UV wavelength range. FIG. 6B illustrates spectral intensity distributions as the spectral luminous characteristics of the LEDs. Reference sign 611 indicates the spectral intensity distribution of the blue LED. Reference sign 612 indicates the spectral intensity distribution of the green LED. Reference sign 613 indicates the spectral intensity distribution of the red LED. Reference sign 614 indicates the spectral intensity distribution of the UV LED.

The second example is a white LED and a UV LED having their spectral distributions in a visible light range. FIG. 6C illustrates a spectral intensity distribution as the spectral luminous characteristic of the white LED. Reference sign 621 indicates the spectral luminous intensity distribution of the white LED. Reference sign 622 indicates the spectral intensity distribution of the UV LED.

The third example is a tungsten light source having a spectral distribution also in the UV wavelength range. Reference sign 631 in FIG. 6D indicates a spectral intensity distribution as the spectral luminous characteristic of the tungsten light source.

FIG. 6E illustrates spectral sensitivity distributions as spectral sensitivity characteristics of optical filters. Reference sign 641 indicates the spectral sensitivity distribution of the blue filter, which blocks light beams of colors other than blue. Reference sign 642 indicates the spectral sensitivity distribution of the green filter, which blocks light beams of colors other than green. Reference sign 643 indicates the spectral sensitivity distribution of the red filter, which blocks light beams of colors other than red. Note that the green filter is a filter that blocks light beams outside the excitation wavelength range of the fluorescent pink ink, and the red filter is filter which blocks light beams outside the luminous wavelength range of the fluorescent pink ink.

<Characteristics of Fluorescent Ink and Non-fluorescent Inks>

Figure 7:
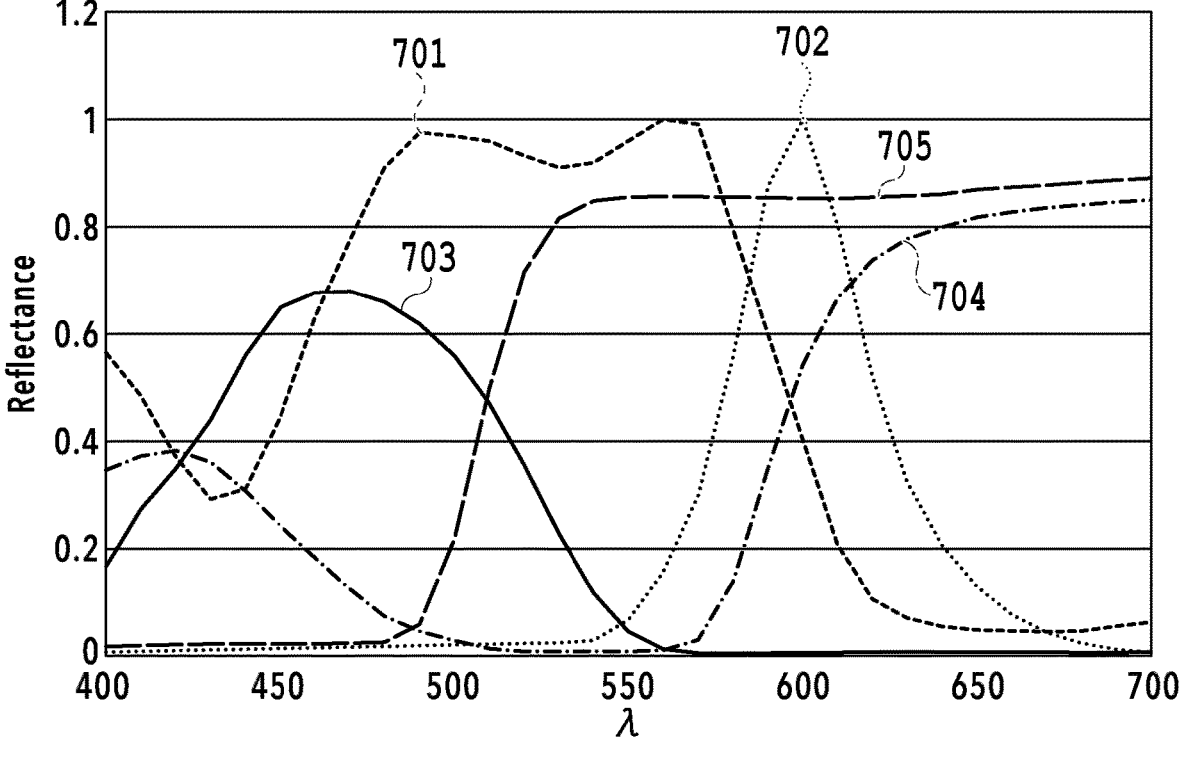
FIG. 7 is a chart of the excitation wavelength and luminous wavelength of a fluorescent ink and the spectral reflectances of non-fluorescent inks.

Fluorescent color materials are color materials that reproduce colors by shifting from a ground state to an excited state through absorption of light of the excitation wavelength and returning to the ground state through emission of light of the luminous wavelength. FIG. 7 illustrates the intensity of excitation 701 and the intensity of light emission 702 of the fluorescent pink ink printed on a sheet surface. The horizontal axis represents the wavelength of light, and the vertical axis represents the reflectance (intensity). The graph illustrated in FIG. 7 illustrates the intensity of light detected while the wavelength of light to be applied to a printing sample and the wavelength of light to be received from the sample are each changed.

The light emission 702 indicates, on a wavelength-by-wavelength basis, the intensity of light received from the printing sample in response to applying light of the excitation wavelength to the printing sample. FIG. 7 illustrates a graph in a case of applying 480-nm light to the printing sample for the fluorescent pink ink in the present embodiment.

The excitation 701 indicates the intensity of light received in a case of fixing the wavelength of light to be received and changing the wavelength of light to be applied to the printing sample. FIG. 7 illustrates a graph in a case of fixing the wavelength of light to be received at 600 nm for the fluorescent pink in the present embodiment.

As can be understood from FIG. 7, the wavelength range in which a fluorescent ink printed on a sheet surface gets excited overlaps the wavelength range in which the fluorescent ink emits light and is situated on the shorter wavelength side of the luminous wavelength range. Also, the intensity of the excitation 701 varies by wavelength, and there are wavelengths at which light is emitted efficiently and wavelengths at which light is not emitted so. Moreover, since the fluorescent color material emits light, the reflectance at the luminous wavelength tends to exceed 1. In the present embodiment, a color material having characteristics as described above is defined as a fluorescent color material.

While excitation and light emission of the fluorescent pink ink have been described above, a fluorescent ink that emits light of another wavelength may be adopted in the present embodiment. Examples of such a fluorescent ink include a fluorescent blue ink that emits light in a blue range (450 nm to 500 nm) and a fluorescent green that emits light in a green range (500 nm to 565 nm). Also, a fluorescent yellow ink that emits light in a yellow range (565 nm to 590 nm), a fluorescent orange or fluorescent red ink that emits light in a red range (590 nm to 780 nm), or the like, may be adopted. Moreover, a fluorescent ink obtained by combining any of the above fluorescent inks may be adopted. Furthermore, fluorescent inks with different excitation wavelengths may be combined to adjust the color tone. Examples of such fluorescent inks include a fluorescent pink ink that gets excited weakly in the blue range and strongly in the green range and emits light in the orange range, and the like.

In the present embodiment, a non-fluorescent ink is defined as an ink containing a color material that absorbs a light beam of a particular wavelength among light beams applied thereto and does not emit light. For example, the spectral reflectance of a non-fluorescent ink appears like the spectral reflectance of cyan (C) 703, magenta (M) 704, or yellow (Y) 705 in FIG. 7. Unlike fluorescent inks, non-fluorescent inks only absorb light, so that the reflectance does not exceed 1.

<Fluorescent Ink>

Next, the fluorescent ink used in the present embodiment will be described. In the present embodiment, a fluorescent ink created by mixing a dispersion with fluorescent characteristics, a solvent, and an activator is used. The fluorescent dispersion used in the present embodiment is a dispersion with fluorescent characteristics. Examples include NKW-3207E (fluorescent pink water dispersion manufactured by Nihon Keiko Kagaku K.K.), NKW-3205E (fluorescent yellow water dispersion manufactured by Nihon Keiko Kagaku K.K.), and so on, but any dispersion with fluorescent characteristics will suffice. The dispersion with fluorescence characteristics contains a fluorescent dye. The content (% by mass) of the fluorescent dye in the ink is preferably 0.1% by mass or more and 5.0% by mass or less.

A known solvent and activator are added to the above fluorescent dispersion, and the fluorescent dispersion is dispersed to become an ink. The method of dispersing the fluorescent dispersion is not particularly limited. For example, it is possible to use a fluorescent dispersion dispersed by means of a surfactant, a resin-dispersed fluorescent dispersion dispersed by means of a dispersion resin, or the like. A combination of fluorescent dispersions adopting different dispersion methods can be used as a matter of course. An anionic, non-ionic, cationic, or amphoteric surfactant is usable as the surfactant. Any resin is usable as the dispersion resin as long as it is water soluble or water dispersible. In particular, a dispersion resin with a weight average molecular weight of 1,000 or more and 100,000 or less is preferable, and one with a weight average molecular weight of 3,000 or more and 50,000 or less is more preferable. An aqueous medium containing water and a water-soluble organic solvent, for example, is preferably used as the solvent.

<Printing Medium and Fluorescent Whitening Agent>

In the present embodiment, the printing medium to which to discharge the inks (also called "printing target medium") has a base and at least one ink reception layer. The printing medium is preferably an inkjet printing medium for use in inkjet image printing methods.

Incidentally, there are inkjet printing media containing a fluorescent whitening agent in order to make the sheets look whiter. The fluorescent whitening agent absorbs light in an ultraviolet range (330 to 380 nm) (UV light) and emits a fluorescence on a short wavelength side of a visible light range (400 to 450 nm) (blue light). The fluorescent whitening agent is, among various compounds, a compound having affinity to fibers and is one kind of dye. As for dyes, there is no white dye. Thus, the fluorescent whitening agent is used in order to "dye" a sheet white.

The fluorescent whitening agent is added mainly to the ink reception layer (application layer), and its component is 2,5-thiophenediylbis(5-tert-butyl-1,3-benzoxazole). Moreover, its content is generally 0.1 g/square meter or more and 2.0 g/square meter or less.

<Printing and Measurement of Patches>

In the present embodiment, patches are read with the color sensor illustrated in FIG. 6A.

Figure 8A:
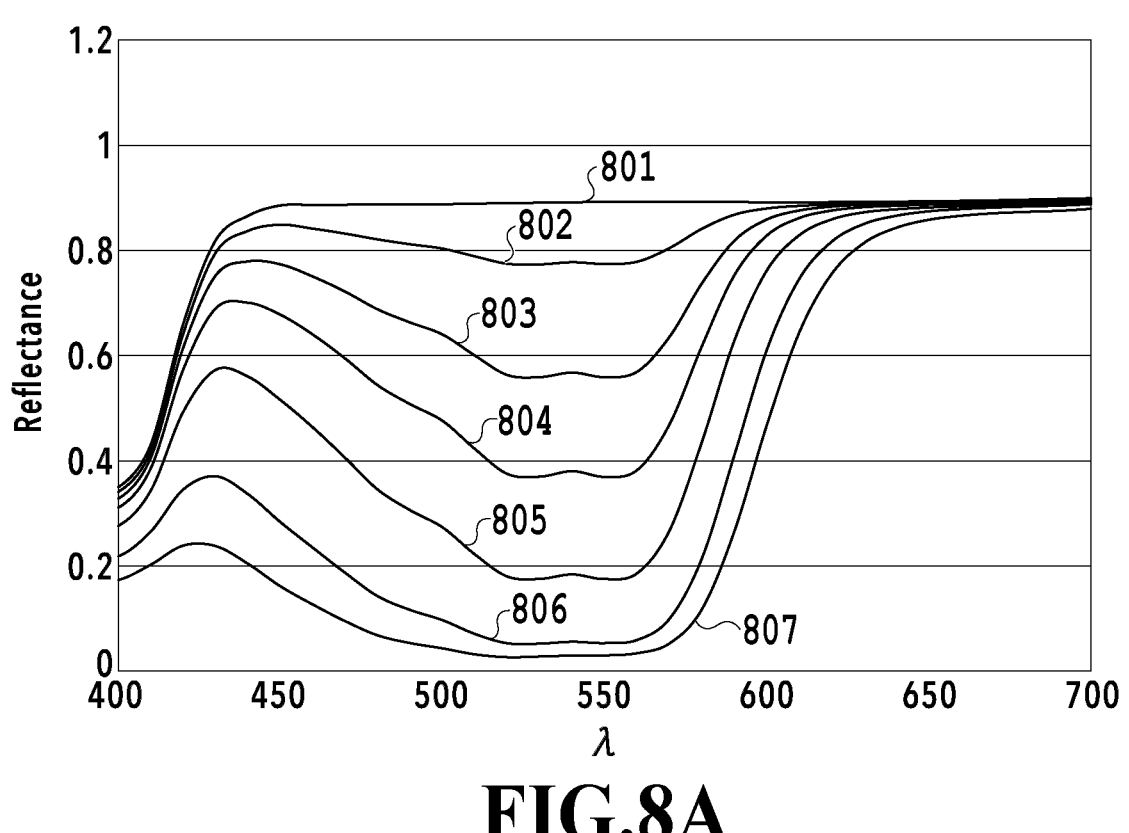
FIGS. 8A and 8B are charts of spectral reflectances.

First, an example of reading magenta gradation patches will be described. FIG. 8A illustrates ink spectral reflectances obtained by measuring magenta patches printed on a sheet surface with a spectrocolorimeter. In each of the charts in FIGS. 8A and 8B, the horizontal axis represents a wavelength $\lambda$, and the vertical axis represents a reflectance Reflectance. In FIG. 8A, reference sign 801 indicates the reflectance of the paper white, and reference signs 802 to 807 indicate the reflectances of calibration patches obtained with the application amount modulated at 20% intervals.

As described earlier, the color sensor in the present embodiment applies light in a visible light range including a UV range (300 to 700 nm) and limits the wavelength range of light to be received by means of an optical filter. In a case of measuring magenta patches, the color sensor performs the measurement with the green filter. The change in reflectance in response to a change in the amount of the magenta ink is large at around 540 nm. Thus, using the green filter at the time of receiving light with the sensor enables the sensor to efficiently detect the change in ink amount. Reference sign 901 in FIG. 9A indicates an example result of measurement of seven patches printed with the magenta ink by using the color sensor.

As illustrated in FIG. 6E, each filter has its predetermined wavelength bandwidth. For example, the green filter has its sensitivity spectrum in a wavelength range of around 500 to 600 nm, and allows the sensor to receive reflected light of applied light, as illustrated in FIG. 6A. With a non-fluorescent ink, the amount of the reflected light decreases, thereby reducing the output value (reflection coefficient) of the sensor, the larger the ink amount becomes. The changes in discharge amount are estimated based on this amount of reduction. Specifically, a target density and the density with the actually used apparatus calculated by using the output value (reflection coefficient) of the sensor with Equation 1 or 2 are compared. In a case when the density with the actually used apparatus is lower than the target density, the discharge amount of the actually used apparatus is estimated to be less than the discharge amount of the base apparatus. On the other hand, in a case when the density with the actually used apparatus is higher than the target density, the discharge amount of the actually used apparatus is estimated to be larger than the discharge amount of the base apparatus.

Figure 8B:
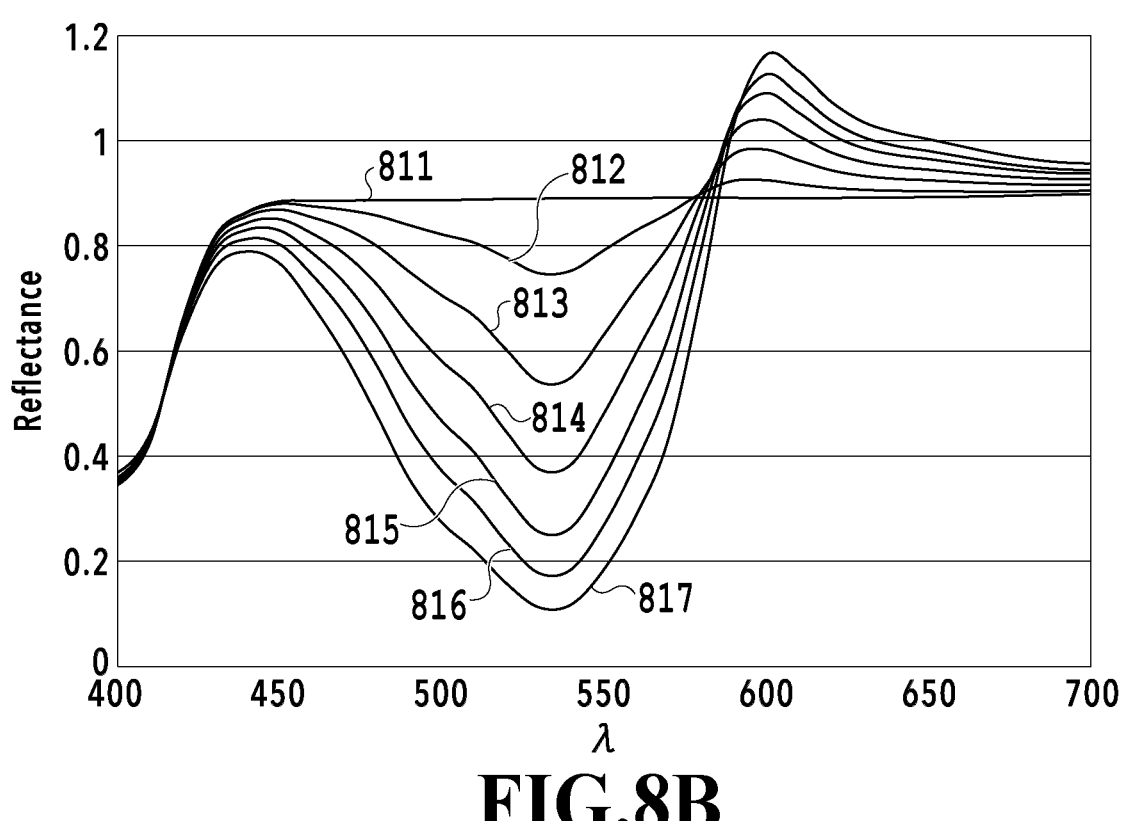

Next, an example of reading fluorescent pink gradation patches will be described. FIG. 8B illustrates ink spectral reflectances obtained by measuring patches printed on a sheet surface only with the fluorescent pink ink by using the spectrocolorimeter. In FIG. 8B, reference sign 811 indicates the spectral reflectance of the paper white, and reference signs 812 to 817 indicate the spectral reflectances of calibration patches obtained with the application amount modulated at 20% intervals.

In the measurement with the color sensor, light in the visible light range including a UV range (300 to 700 nm) is applied. For accurate measurement, it is necessary to perform the measurement using an optical filter to separate the wavelength range of light to be received. There are two methods to separate the wavelength of light to be received, namely, one in which light in the excitation wavelength range (excitation wavelength light) is received, and one in which light in the luminous wavelength range (luminous wavelength light) is received.

Here, an example of receiving light in the excitation wavelength range will be described. As mentioned earlier, the reflectance of the fluorescent pink ink, which absorbs light of a wavelength of around 540 nm, changes greatly at around $\lambda=540$ nm. Thus, the green filter is used as the optical filter for receiving light (see FIG. 6E). In that case, it is possible to measure the amount of reduction of light absorbed by the ink out of light reflected by the paper white of the sheet. Reference sign 911 in FIG. 9B indicates a measurement result obtained by the sensor in this case.

Next, an example of receiving light in the luminous wavelength range will be discussed. As mentioned earlier, the fluorescent pink ink emits light at around $\lambda=600$ nm by fluorescence. Thus, the red filter is used as the optical filter for receiving light (see FIG. 6E). Reference sign 921 in FIG. 9C indicates a measurement result obtained by the sensor in this case.

Figures 9A, 9B, 9C, 9D, 9E:
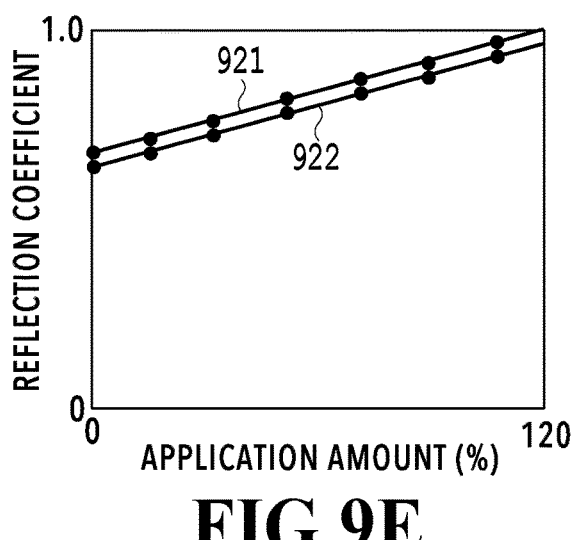
FIGS. 9A to 9E are charts illustrating results of measurement of gradation patches for calibration with a color sensor.

Note that, in a case of a sheet containing a fluorescent whitening agent, unevenness of the fluorescent whitening agent affects the measured value. Specifically, in a case when the fluorescent whitening agent degrades due to temporal change, the measured value becomes smaller than before the degradation. FIG. 9D illustrates cases of receiving excitation wavelength light as an example of such a change in the measured value. Reference sign 911 indicates the measured value before the degradation, and reference sign 912 indicates the measured value after the degradation. FIG. 9E, on the other hand, illustrates cases of receiving luminous wavelength light. Reference sign 921 indicates the measured value before the degradation, and reference sign 922 indicates the measured value after the degradation.

This phenomenon will be specifically described using FIGS. 10A to 10D illustrating a simple reflection model and measurement results obtained with a spectrocolorimeter.

FIG. 10A illustrates a simple reflection model with a sample obtained by printing a dot 1002 of a fluorescent ink on a print sheet 1001 containing a fluorescent whitening agent.

In a case when light including UV light is applied to the sample, which was obtained by printing the fluorescent ink on the sheet, a half of applied light 1003 becomes first reflected light 1004 reflected by the ink layer and existing into the air. The other half, on the other hand, becomes incident light 1005 entering the sheet, which is reflected inside the sheet and becomes second reflected light 1006 entering the ink layer again and then exiting into the air. The measurement device measures combined light of the first reflected light 1004 and the second reflected light 1006. In reality, complicated light absorption and scattering occur inside the ink and the sheet but are taken into account in the present embodiment for simplicity.

As illustrated in FIG. 10B, in a case when UV light 1012 in a wavelength range of 330 to 380 nm is applied to a sheet 1011 containing a fluorescent whitening agent, the sheet emits light 1013 in a blue wavelength range (400 to 450 nm). Accordingly, the amount of light reflected by a sheet containing a fluorescent whitening agent, specifically, the amount of light in the blue wavelength range included in the second reflected light 1006 illustrated in FIG. 10A, is greater than that from a sheet containing no fluorescent whitening agent. Hence, the amount of excitation wavelength light and the amount of luminous wavelength light increase in the course of passage through the layer of the fluorescent ink dot 1002.

FIG. 10C illustrates spectral reflectances obtained by measuring patches printed with the fluorescent pink ink on a sheet containing a fluorescent whitening agent and a sheet containing no fluorescent whitening agent with a spectrocolorimeter. Incidentally, "Canon Photo Paper • Glossy Pro [Platinum Grade]" is used as the sheet containing a fluorescent whitening agent, and "Canon Glossy Type Roll Paper (Double-sided)" is used as the sheet containing no fluorescent whitening agent. Each of them is a resin-coated paper. In FIG. 10C, reference sign 1021 indicates the spectral reflectance with the sheet containing a fluorescent whitening agent, and reference sign 1022 indicates the spectral reflectance with the sheet containing no fluorescent whitening agent.

The amount of light reflected at the sheet surface of the sheet containing a fluorescent whitening agent, i.e., the amount of light in the blue wavelength range included in the second reflected light 1006, is larger, although this varies depending on the sheet type. Accordingly, as the second reflected light 1006 passes through the layer of the fluorescent ink dot 1002, the amount of green reflected light (reference sign 1023), which is excitation wavelength light, and also the amount of red reflected light (reference sign 1024) emitted in response to excitation become greater than those with the sheet with no fluorescent whitening agent. This result indicates that, in the case of using the sheet containing a fluorescent whitening agent, the amounts of excitation wavelength light and luminous wavelength light will decrease if the fluorescent component in the sheet degrades due to temporal change.

Next, FIG. 10D illustrates spectral reflectances obtained by measuring patches printed on the sheets by applying the yellow ink first and then printing the fluorescent pink ink with the spectrocolorimeter. In FIG. 10D, reference sign 1031 indicates the spectral reflectance with the sheet containing a fluorescent whitening agent, and reference sign 1032 indicates the spectral reflectance with the sheet containing no fluorescent whitening agent.

A case of not printing the yellow ink (FIG. 10C) and the case of printing the yellow ink (FIG. 10D) are compared. As indicated by reference signs 1023, 1024, 1033, and 1034, the difference in the reflectance in the excitation wavelength range and the difference in the reflectance in the luminous wavelength range are each less in the case of printing the yellow ink than in the case of not printing the yellow ink. That is, applying the yellow ink first reduces the change in density measured by the sensor that originates from unevenness of the fluorescent whitening agent (difference between production lots, temporal degradation).

<Non-Fluorescent Ink to be Additionally Applied, and how to Apply the Ink>

How to apply a non-fluorescent ink to be additionally applied will be described using FIGS. 11A to 11F. In each of FIGS. 11A to 11F, the top drawing is a diagram of a print sheet 1001 with inks printed thereon as viewed from above, whereas the bottom drawing is a diagram corresponding to the top drawing and illustrating a cross section of the print sheet 1001 with the inks printed thereto as viewed from a side of the sheet.

Figure 11A:
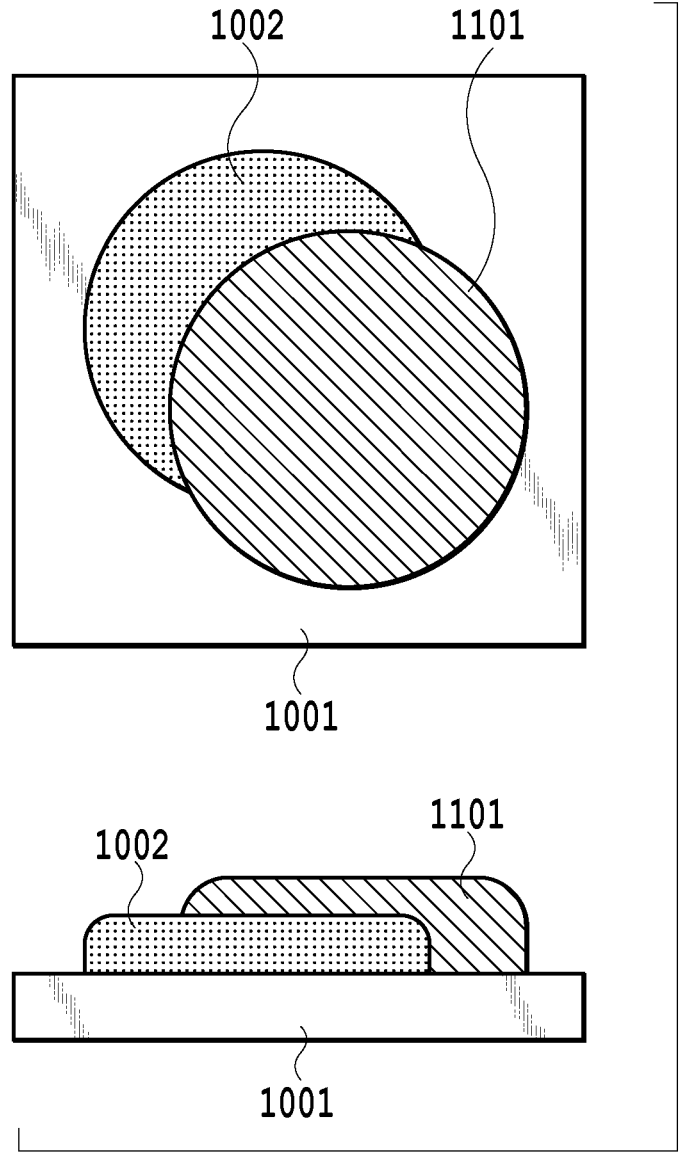
FIGS. 11A to 11G are diagrams schematically illustrating how to apply a fluorescent ink and a non-fluorescent ink.
Figure 11B:
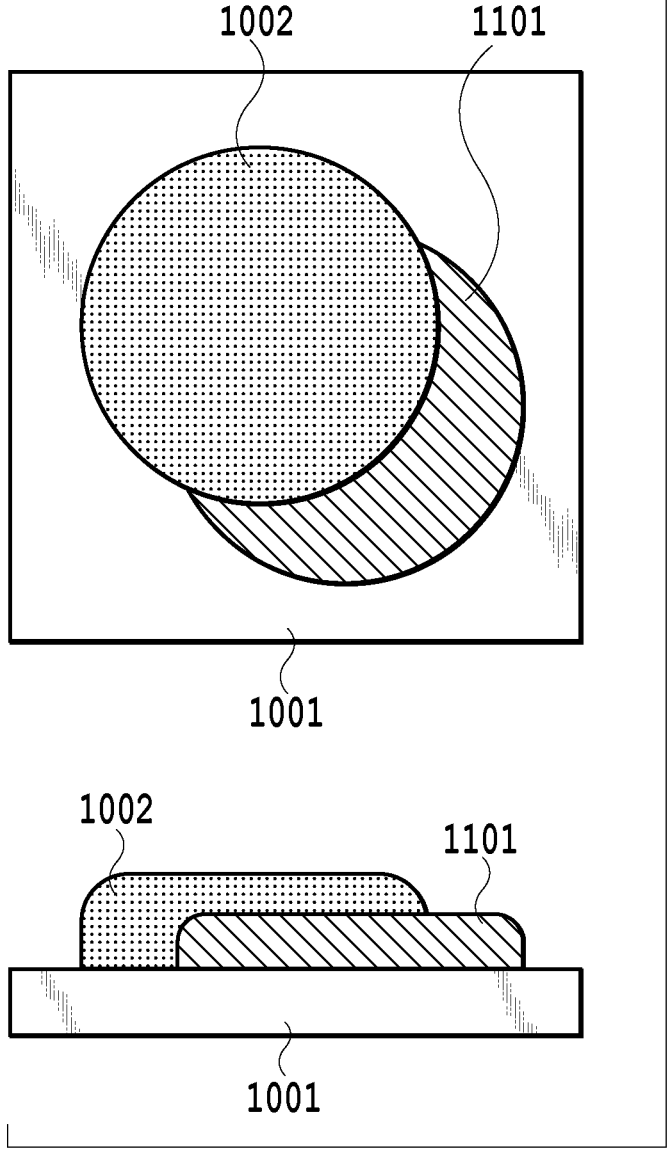

The non-fluorescent ink to be additionally applied in order to relax the influence of the fluorescent whitening agent is desirably an ink having such characteristics as to absorb light having the excitation wavelength or luminous wavelength of the fluorescent whitening agent. As illustrated in FIG. 11A or 11B, dots 1101 of the non-fluorescent ink to be additionally applied are desirably printed such that least one dot overlaps a dot 1002 of the fluorescent ink. The non-fluorescent ink may be applied after the fluorescent ink as illustrated in FIG. 11A or applied before the fluorescent ink as illustrated in FIG. 11B.

Next, how to apply one ink after or before the other will be specifically described.

For example, the printer 407 controls the order of application of the inks to the same area so as to apply the non-fluorescent ink to the position to which the fluorescent ink has been applied. In this way, a dot of the non-fluorescent ink can cover a dot of the fluorescent ink under it at least partly (application of the non-fluorescent ink after the fluorescent ink). Conversely, the printer 407 may control the order of application of the inks to the same area so as to apply the fluorescent ink to the position to which the non-fluorescent ink has been applied. In this way, the non-fluorescent ink can be covered with the fluorescent ink (application of the non-fluorescent ink before the fluorescent ink).

Also, by adjusting the amount of each ink to be applied at its application timing, it is possible to cover a dot of the fluorescent ink with a dot of the non-fluorescent ink to a desired extent or to cover the non-fluorescent ink with the fluorescent ink to a desired extent.

Figure 11C:
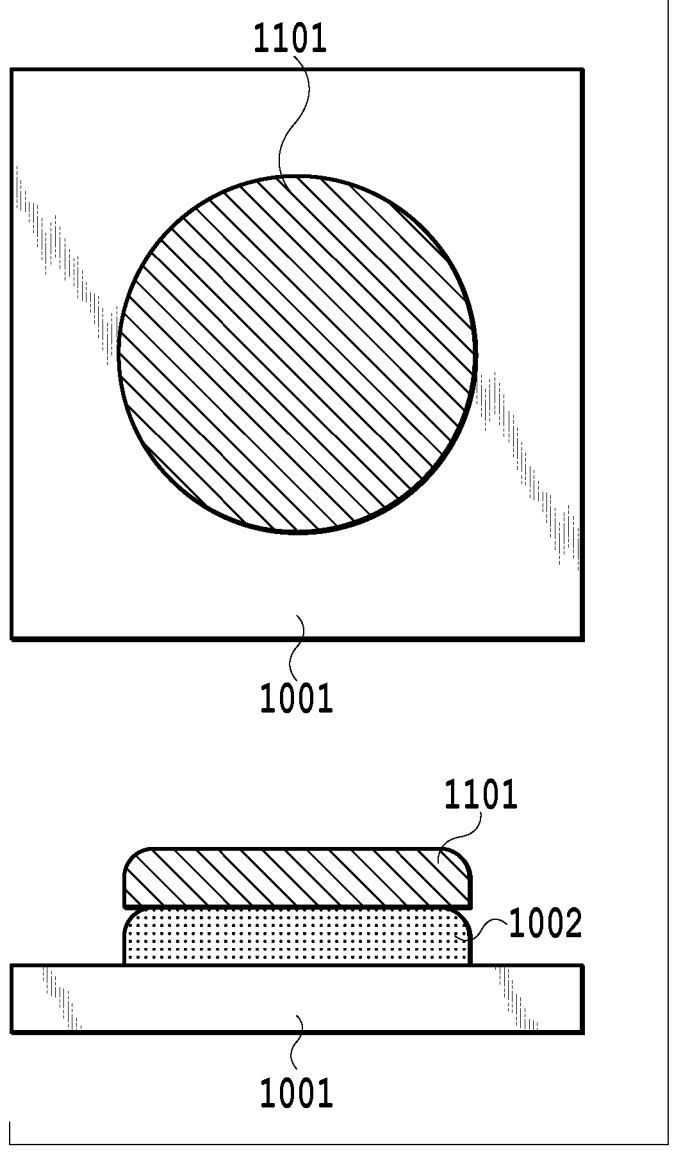

Specifically, the dot 1101 of the non-fluorescent ink to be additionally applied is desirably printed so as to overlap the entire dot 1002 of the fluorescent ink as illustrated in FIG. 11C. In FIG. 11C, the dot diameter of the dot 1101 of the non-fluorescent ink and the dot diameter of the dot 1002 of the fluorescent ink are equal, and the entire upper surface of the dot 1002 of the fluorescent ink is covered with the lower surface of the dot 1101 of the non-fluorescent ink.

Figure 11D:
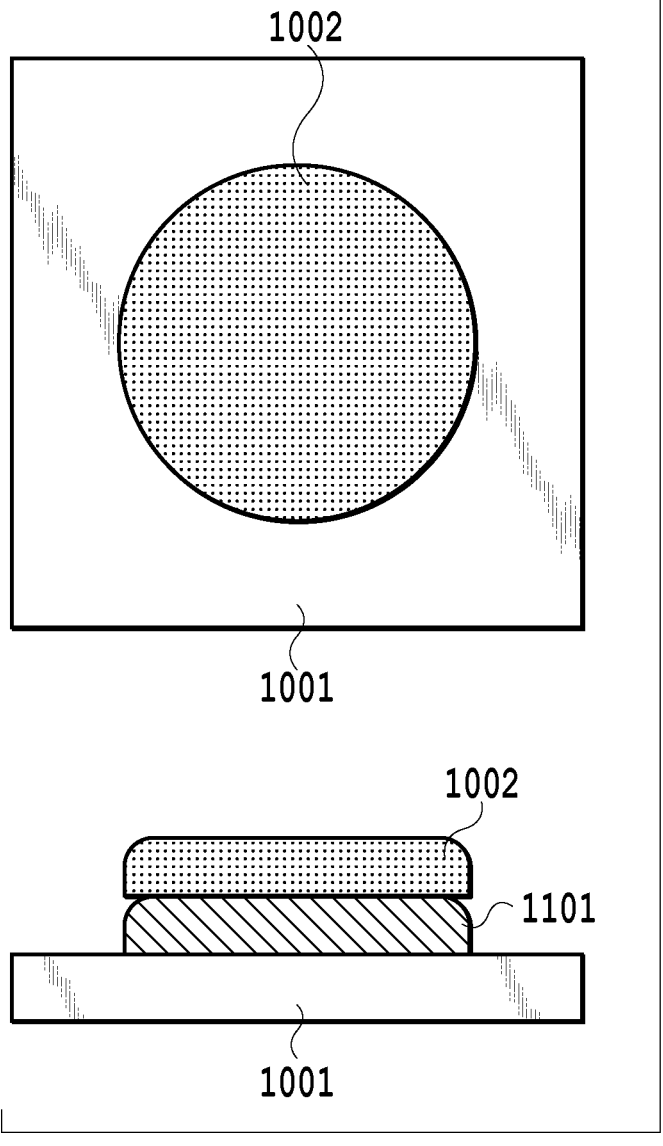

Alternatively, the dot 1002 of the fluorescent ink is desirably printed so as to overlap the entire dot 1101 of the non-fluorescent ink as illustrated in FIG. 11D. In FIG. 11D, the dot diameter of the dot 1101 of the non-fluorescent ink and the dot diameter of the dot 1002 of the fluorescent ink are equal, and the entire upper surface of the dot 1101 of the non-fluorescent ink is covered with the lower surface of the dot 1002 of the fluorescent ink.

Figure 11E:
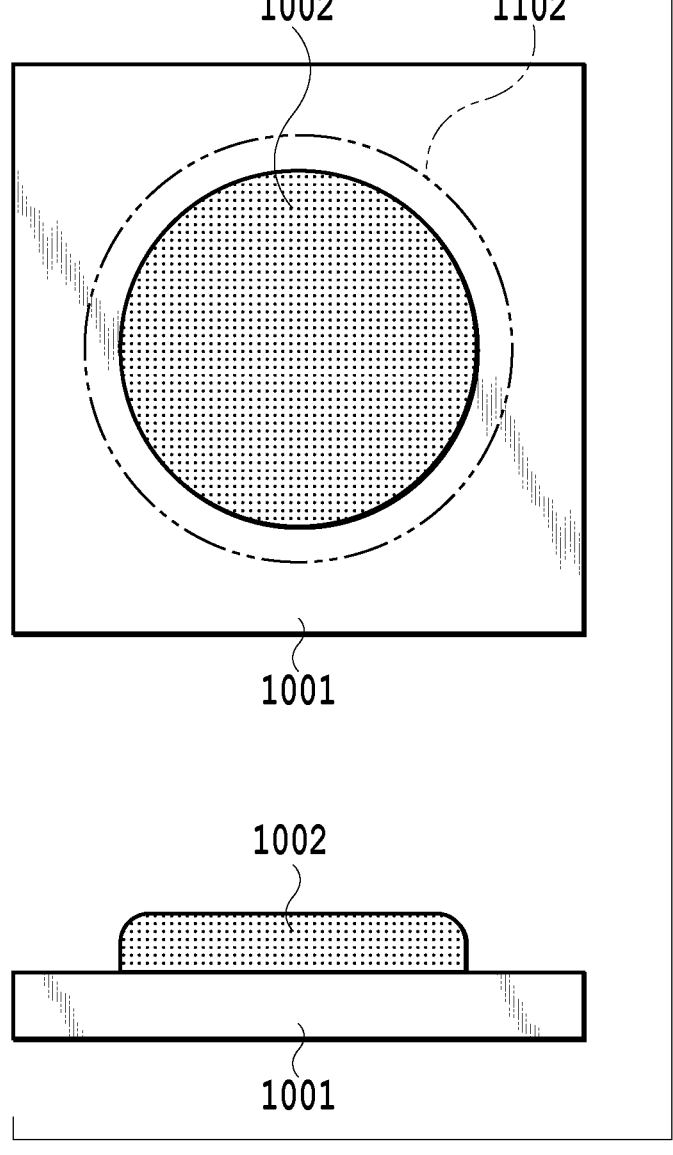

Moreover, it is even more desirable to take into consideration the spread of reflected light as illustrated in FIG. 11E (indicated by reference sign 1102) due to scattering of applied light inside the sheet after passing through the fluorescent ink. Specifically, it is desirable to cover an area reaching the outside of to the spread of the reflected light (indicated by reference sign 1102) with the dot 1101 of the non-fluorescent ink to be additionally applied.

Figure 11F:
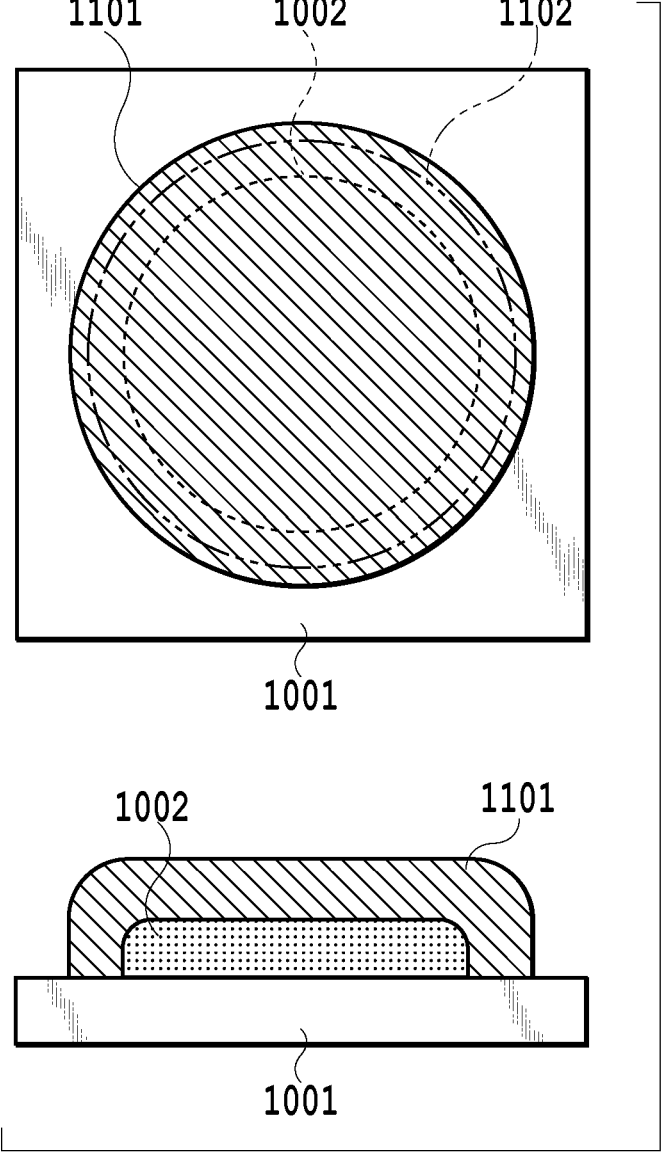
Figure 11G:
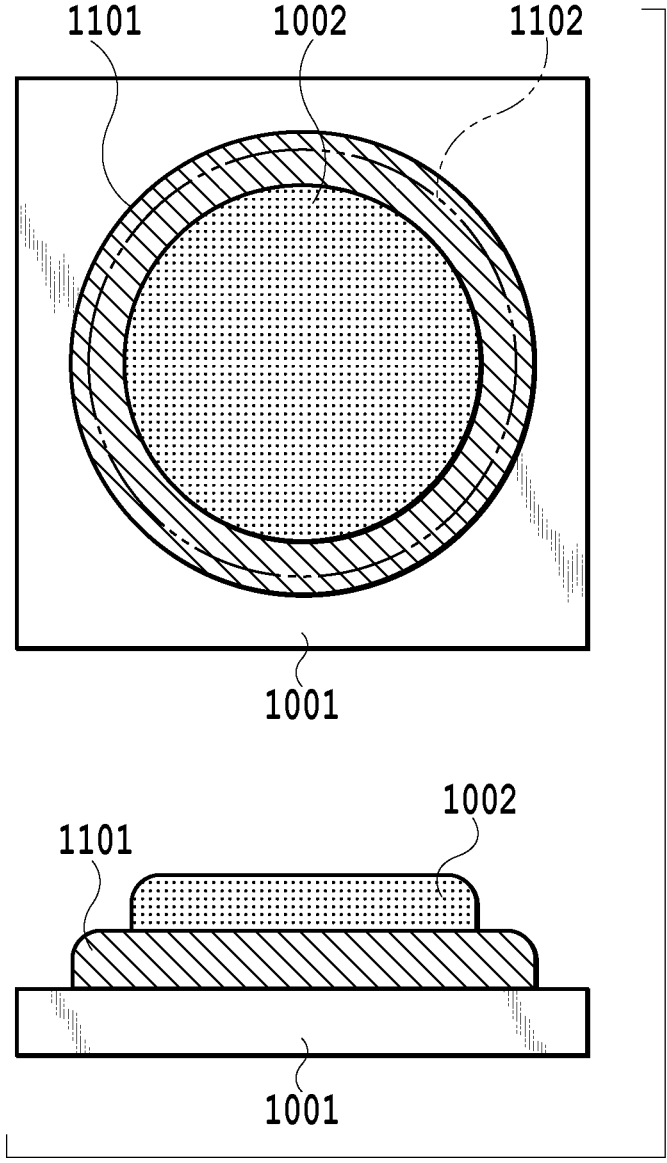

This applies to both the case of applying the non-fluorescent ink after the fluorescent ink (FIG. 11F) and the case of applying the non-fluorescent ink before the fluorescent ink (FIG. 11G). In FIG. 11F, the dot diameter of the dot 1101 of the non-fluorescent ink is larger than the dot diameter of the dot 1002 of the fluorescent ink, and the upper and side surfaces of the dot 1002 of the fluorescent ink are covered with the dot 1101 of the non-fluorescent ink. In FIG. 11G, on the other hand, the dot diameter of the dot 1101 of the non-fluorescent ink is larger than the dot diameter of the dot 1002 of the fluorescent ink, and the lower surface of the dot 1002 of the fluorescent ink is covered with the upper surface of the dot 1101 of the non-fluorescent ink.

Also, the dot 1101 of the non-fluorescent ink to be additionally applied desirably has a thickness and color material density large and high enough to absorb light having the excitation wavelength and luminous wavelength of the fluorescent whitening agent.

<How to Set Ink Amount of Ink to be Additionally Applied>

Figure 12:
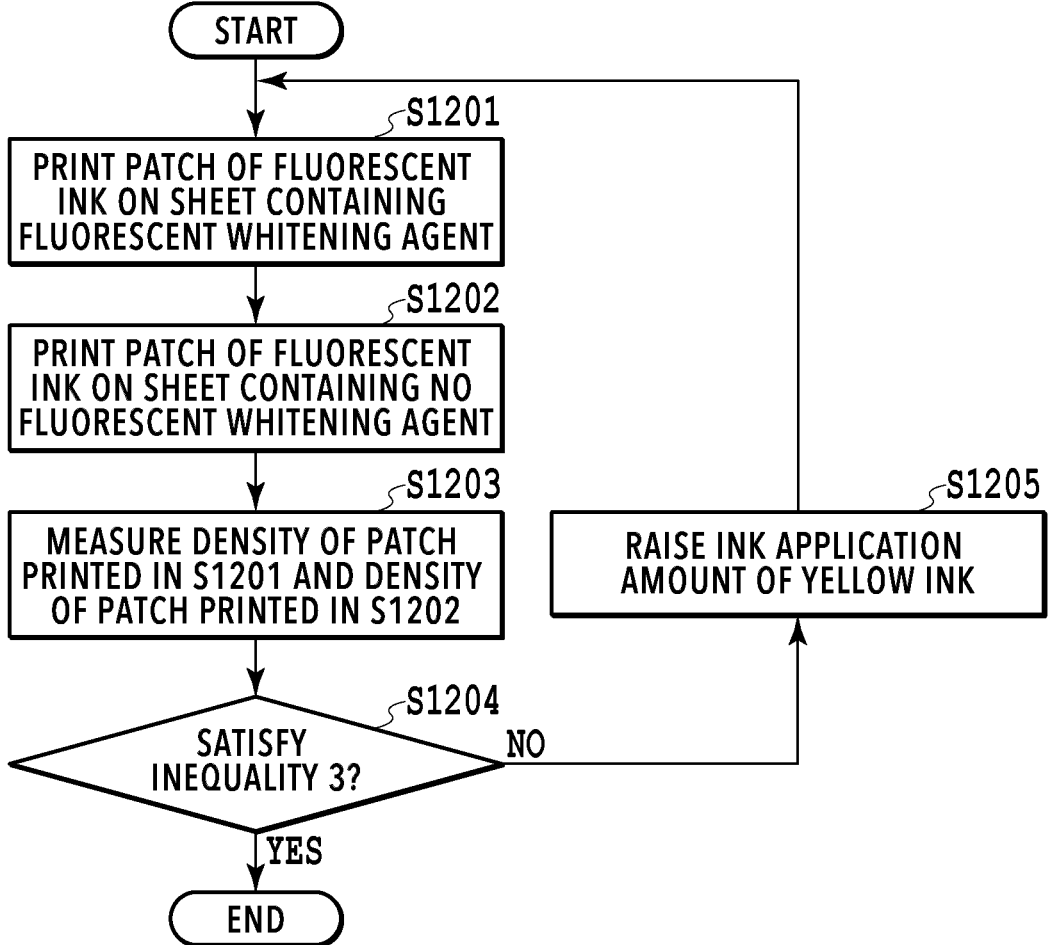
FIG. 12 is a flowchart of a process of determining the application amount of a non-fluorescent ink.

Now, a process of setting the ink amount of the ink to be additionally applied will be described using FIG. 12.

In step S1201, a calibration patch of the fluorescent ink is printed on a sheet containing a fluorescent whitening agent. In the following, "step S_" will be abbreviated as "S_" for simplicity.

In S1202, a calibration patch of the fluorescent ink is printed on a sheet containing no fluorescent whitening agent.

In S1203, the density of the patch printed in S1201 and the density of the patch printed in S1202 are measured, and the difference between these densities is calculated. The density difference calculated in this step will be denoted as $\Delta OD_{fluorescent\ whitening\ agent\ unevenness}$.

Also, a target density difference for the calibration of the fluorescent ink is defined. In addition, errors that are produced in the course of the calibration processing are defined. In the present embodiment, for example, a density difference that varies as printing is repeated is defined as $\Delta OD_{print\ repeatability\ error}$, and a density difference that varies in the course of the measurement is defined as $\Delta OD_{measurement}$ error.

In S1204, whether Inequality 3 below is satisfied is determined.

$$\begin{aligned} &\text{Target} &&\text{Density} &&\text{Difference>} \\ &\{(\Delta OD_{print} &&\text{repeatability} &&error)^2+ \\ &(\Delta OD_{measurement} &&&&error)^2+ \\ &(\Delta OD_{fluorescent\ whitening\ agent\ unevenness})^2\}/3 &&&& \text{Inequality 3} \end{aligned}$$

If the result of the determination in S1204 is positive, the series of processes is terminated. If, on the other hand, the result of the determination in S1204 is negative, the processing proceeds to S1205.

In S1205, the application amount of the non-fluorescent ink (the yellow ink in this example) to be printed along with the fluorescent ink is raised by a predetermined fixed amount and set. Thereafter, the processing returns to S1201, and the processes such as printing a patch and so on are repeated.

The series of processes described above makes it possible to derive an appropriate application amount of the non-fluorescent ink. In the above, the two errors $\Delta OD_{printing\ repeatability\ error}$ and $\Delta OD_{measurement}$ error are mentioned as an example of errors that are produced in the course of the calibration processing. However, the errors are not limited to these.

Moreover, while the target density difference for calibration is calculated using the mean squared error of density, another error calculation equation may be used.

Also, while density is used as a value for quantitative evaluation of the ink discharge amount, the value for the quantitative evaluation is not limited to density. A color value (such as CIE L*a*b* or tristimulus values XYZ) may be used.

<Calibration Processing>

Processes in the calibration processing in the present embodiment will be described below using FIG. 13A. These processes are executed by the CPU 403, and the like, according to a calibration processing program stored in the storage unit 405 in FIG. 4. Parameters necessary for the calibration processing are input through the UI unit 402.

In S1301, a calibration patch chart is printed. In the following, a process of printing the calibration patch chart illustrated in FIG. 2 will be described. First, patches are created with the application amount modulated at 20% intervals from 0% to 120%. While patches created with the application amount modulated at 20% intervals from 0% to 120% as illustrated in FIG. 2 are used in this example, the intervals may be other than 20%, and the maximum application amount may be other than 120%.

Then, it is checked whether the patch chart illustrated in FIG. 2 has been created with all inks with which to create patches. If the patch chart has been created with all inks, patch chart data is stored in the storage unit 405.

Then, information on printing on a medium (such as a sheet) is read out of the storage unit 405, and the read information is transmitted to the printer 407. The patch chart data created and stored is likewise read out of the storage unit 405, and then is input to an output unit of the calibration processing unit 107 through the image signal I/F 101 for color-material color signals (see FIG. 1), and directly subjected to next halftoning processing. Thereafter, the patch chart data is printed by the printing unit 411.

In the present embodiment, the calibration patches are created in the course of the calibration processing. Alternatively, patch chart data created in advance may be held in the storage unit 405, and this patch chart data may be read out and used in a case of executing the calibration processing.

Next, processes for measuring the patches included in the printed patch chart (S1302 to S1306) will be described. First, in S1302, the printer control unit 409 determines whether the patches to be measured are the patches of the fluorescent ink. If the result of the determination in this step is positive, the printer control unit 409 proceeds to S1303. If the result of the determination in this step is negative, the printer control unit 409 proceeds to S1305.

In S1303, the printer control unit 409 irradiates each patch with light having a spectral distribution within a wavelength range covering the excitation wavelength and luminous wavelength of the fluorescent ink.

In S1304*a*, the printer control unit 409 reads the reflection intensity with the sensor unit 412, which receives light with the luminous wavelength of the fluorescent ink passing through the red filter, to thereby obtain the result of measurement by the sensor unit 412. Specifically, the reflection intensity of each patch is read in the manner described earlier in
<Printing and Measurement of Patches>.

Incidentally, in the present embodiment, the light to be applied in the measurement of the calibration patches is selected in the course of the calibration processing. However, the measurement may be performed by following light application conditions held in the storage unit 405 in advance.

In S1305, the printer control unit 409 irradiates each patch with light having a spectral distribution within a wavelength range in which the spectral reflectance of the ink changes greatly in response to a change in discharge amount, and reads the reflection intensity with the sensor unit 412 to thereby obtain the result of measurement by the sensor unit 412.

S1306, the printer control unit 409 determines whether the patches of all ink colors to be measured have been measured. If the result of the determination in this step is positive, the printer control unit 409 proceeds to S1307 in order to execute calibration. If the result of the determination in this step is negative, the printer control unit 409 returns to S1302.

Next, processes for actually executing the calibration (S1307 to S1309) will be described. First, in S1307, based on a reflection intensity read in the patch measurement, the printer control unit 409 estimates the corresponding discharge amount.

In S1308, based on the result of the estimation in S1307, the printer control unit 409 corrects the application amount of the corresponding ink. Specifically, the printer control unit 409 executes the correction processing by using a 1D-LUT stored in the calibration processing unit 107 in the manner described earlier in <Execution of Calibration>.

In S1309, the printer control unit 409 determines whether the calibration has been executed for all ink colors. If the result of the determination in this step is positive, the printer control unit 409 terminates the series of processes. If the result of the determination in this step is negative, the printer control unit 409 returns to S1307.

In the present embodiment, the tone correction processing unit 106 performs processing by using 1D-LUTS different from the 1D-LUTS used by the calibration processing unit 107. Alternatively, the tone correction processing unit 106 and the calibration processing unit 107 may use a single 1D-LUT obtained by combining these 1D-LUTs to perform their processing.

Advantageous Effect of Present Embodiment

According to the present embodiment, it is possible to perform accurate color calibration of a printing apparatus that performs printing with a fluorescent ink regardless of unevenness of a fluorescent whitening agent contained in the sheet.

Second Embodiment

In the first embodiment, the red filter is used as the optical filter on the light receiving side in a case of measuring light having the luminous wavelength of the fluorescent pink ink with the sensor. Alternatively, the green filter can be used as the optical filter on the light receiving side to estimate differences in discharge amount. FIG. 13B is a flowchart illustrating the calibration processing in that case.

Figures 13A, 13B:
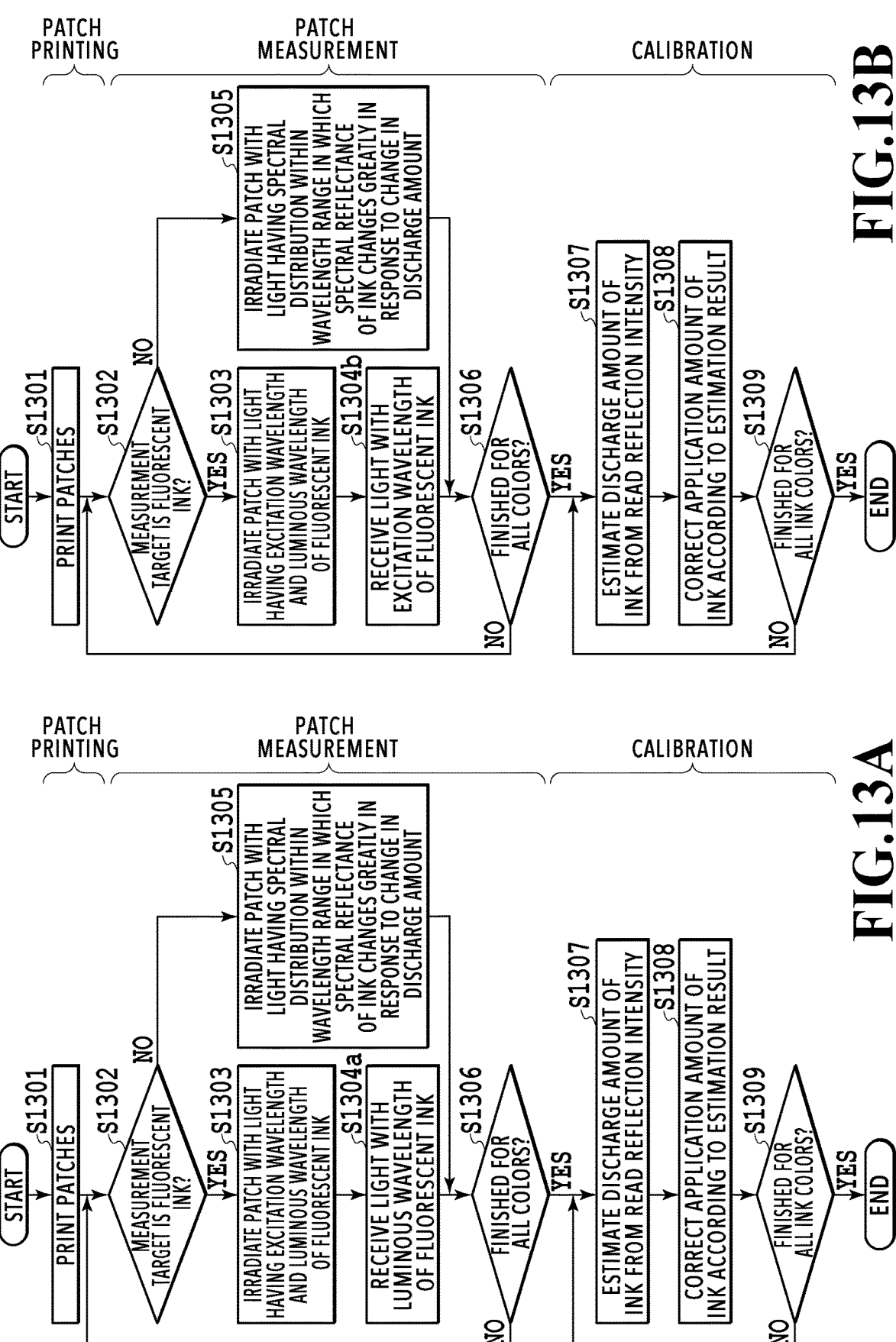
FIGS. 13A and 13B are flowcharts of calibration processing.

The flowchart of FIG. 13B differs from FIG. 13A in that the flowchart includes a process of S1304*b* in place of S1304*a*. In the case of using the red filter, the measured value of the sensor is the value indicated by reference sign 921 in FIG. 9C. In the case of using the green filter as in the present embodiment, the measured value of the sensor is the value indicated by reference sign 911 in FIG. 9D. By using the green filter, it is possible to measure the amount of reduction of light absorbed by the ink out of light reflected by the paper white of the sheet.

Advantageous Effect of Present Embodiment

According to the present embodiment, it is possible to perform accurate color calibration of a printing apparatus that performs printing with a fluorescent ink regardless of unevenness of a fluorescent whitening agent contained in the sheet.

OTHER EMBODIMENTS

In the above-described embodiments, the printing method of the printing apparatus is an inkjet method. However, it is not the only adoptable printing method, and the printing method may be another method such as an electrophotographic method or a thermal transfer method.

In the above-described embodiments, the reflection coefficient is used to describe the measured value of the sensor. Alternatively, a density or a color value calculated from the reflection coefficient may be used (e.g., CIE L*a*b*, tristimulus values XYZ, or the like).

In the above-described embodiments, gradation patches have been described as a patch chart for calibration. Alternatively, a correction table may be generated by estimating discharge amounts corresponding to particular tones.

In the above-described embodiments, a photodiode has been described as the light-sensitive element of the color sensor. Alternatively, the configuration may be such that the light-sensitive element of the color sensor is a phototransistor, or the like.

In the above-described embodiments, a configuration in which the color sensor is mounted on a side of the carriage has been described. Alternatively, the configuration may be such that the color sensor is mounted at a position other than that portion or is capable of manual measurement.

In the above-described embodiments, red, green, and blue LEDs have been used to describe the color sensor's LEDs. Alternatively, LEDs of other colors may be used. Also, the number of colors is not limited to three and may be more than or less than three.

In the above-described embodiments, the yellow ink is used as the non-fluorescent ink to be additionally applied in order to relax the influence of the fluorescent whitening agent. However, an ink of any other color may be used as long as the ink has such characteristics as to absorb light in the excitation wavelength range of the fluorescent whitening agent and light in the luminous wavelength range of the fluorescent whitening agent.

In the above-described embodiments, a fluorescent ink is used as an example of a fluorescent material with which to perform printing on a printing medium. Alternatively, another fluorescent material such as a fluorescent toner may be used.

Embodiment(s) of the present disclosure can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

According to the present disclosure, it is possible to accurately perform color calibration of a printing apparatus that performs printing with a fluorescent material regardless of unevenness of a fluorescent whitening agent contained in the sheet.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A control apparatus comprising:
   one or more circuits or one or more processors and at least one memory, the at least one memory being coupled to the one or more processors and having stored thereon instructions executable by the one or more processors, wherein at least one of the one or more circuits or the execution of the instructions cause the control apparatus to function as:
   a control unit that controls printing of a patch on a printing medium, the patch being formed by printing a fluorescent material;
   an estimation unit configured to estimate a discharge amount of the fluorescent material based on a reflection intensity obtained by receiving light reflected by the printing medium on which the patch is printed; and
   a correction unit configured to correct a printing amount of the fluorescent material based on an estimation result obtained by the estimation unit,
   wherein the patch is printed using the fluorescent material and a non-fluorescent material, and at least one dot of the non-fluorescent material overlaps a dot of the fluorescent material,
   a luminous wavelength of a fluorescent whitening agent contained in the printing medium is an excitation wavelength of the fluorescent material, and
   the non-fluorescent material absorbs at least one of light in an excitation wavelength range of the fluorescent whitening agent or light in a luminous wavelength range of the fluorescent whitening agent.

2. The control apparatus according to claim 1, wherein the dot of the non-fluorescent material has such a thickness and color material density as to be capable of absorbing light in the excitation wavelength range of the fluorescent whitening agent and light in the luminous wavelength range of the fluorescent whitening agent.

3. The control apparatus according to claim 1, wherein a light-sensitive element that receives light reflected by the printing medium receives light included in at least part of an excitation wavelength range and a luminous wavelength range of the fluorescent material.

4. The control apparatus according to claim 3, wherein a sensor unit having the light-sensitive element further has a filter provided in front of the light-sensitive element.

5. The control apparatus according to claim 4, wherein the filter blocks light outside the excitation wavelength range of the fluorescent material.

6. The control apparatus according to claim 5, wherein the fluorescent material is a fluorescent pink ink, the non-fluorescent material is a yellow ink, and the filter is a green filter.

7. The control apparatus according to claim 4, wherein the filter blocks light outside the luminous wavelength range of the fluorescent material.

8. The control apparatus according to claim 7, wherein the fluorescent material is a fluorescent pink ink, the non-fluorescent material is a yellow ink, and the filter is a red filter.

9. The control apparatus according to claim 1, wherein the control unit controls an order of printing of the fluorescent material and the non-fluorescent material.

10. The control apparatus according to claim 9, wherein all of dots of the fluorescent material overlap a single dot of the non-fluorescent material, and the non-fluorescent material is printed after the fluorescent material.

11. The control apparatus according to claim 10, wherein the dot of the non-fluorescent material covers the dots of the fluorescent material at least partly.

12. The control apparatus according to claim 10, wherein a diameter of the dot of the non-fluorescent material and a diameter of the dots of the fluorescent material are equal to each other, and a lower surface of the dot of the non-fluorescent material covers entire upper surfaces of the dots of the fluorescent material.

13. The control apparatus according to claim 10, wherein a diameter of the dot of the non-fluorescent material is larger than a diameter of the dots of the fluorescent material, and the dot of the non-fluorescent material covers upper surfaces and side surfaces of the dots of the fluorescent material.

14. The control apparatus according to claim 9, wherein all of dots of the fluorescent material overlap a single dot of the non-fluorescent material, and the non-fluorescent material is printed before the fluorescent material.

15. The control apparatus according to claim 14, wherein the dots of the fluorescent material cover the dot of the non-fluorescent material at least partly.

16. The control apparatus according to claim 14, wherein a diameter of the dot of the non-fluorescent material and a diameter of the dots of the fluorescent material are equal to each other, and lower surfaces of the dots of the fluorescent material cover an entire upper surface of the dot of the non-fluorescent material.

17. The control apparatus according to claim 14, wherein a diameter of the dot of the non-fluorescent material is larger than a diameter of the dots of the fluorescent material, and an upper surface of the dot of the non-fluorescent material covers entire lower surfaces of the dots of the fluorescent material.

18. The control apparatus according to claim 1, further comprising:

a white light source that emits UV light; and a sensor unit having a light-sensitive element that receives light emitted by the white light source and reflected by the printing medium on which the patch is printed.

19. A control method of controlling a control apparatus that includes one or more circuits or one or more processors and at least one memory, the at least one memory being coupled to the one or more processors and having stored thereon instructions executable by the one or more processors, the control method comprising:

controlling printing of a patch on a printing medium, the patch being formed by printing a fluorescent material; and correcting a printing amount of the fluorescent material based on a measurement result obtained by receiving light reflected by the printing medium on which the patch is printed, wherein the patch is printed using the fluorescent material and a non-fluorescent material, and at least one dot of the non-fluorescent material overlaps a dot of the fluorescent material, a luminous wavelength of a fluorescent whitening agent contained in the printing medium is an excitation wavelength of the fluorescent material, and the non-fluorescent material absorbs at least one of light in an excitation wavelength range of the fluorescent whitening agent or light in a luminous wavelength range of the fluorescent whitening agent.

20. A non-transitory computer readable storage medium storing a program that causes a computer to execute a control method of controlling a control apparatus, the control apparatus including one or more circuits or one or more processors and at least one memory, the at least one memory being coupled to the one or more processors and having stored thereon instructions executable by the one or more processors, the control method comprising:

controlling printing of a patch on a printing medium, the patch being formed by printing a fluorescent material; and correcting a printing amount of the fluorescent material based on a measurement result obtained by receiving light reflected by the printing medium on which the patch is printed, wherein the patch is printed using the fluorescent material and a non-fluorescent material, and at least one dot of the non-fluorescent material overlaps a dot of the fluorescent material, a luminous wavelength of a fluorescent whitening agent contained in the printing medium is an excitation wavelength of the fluorescent material, and the non-fluorescent material absorbs at least one of light in an excitation wavelength range of the fluorescent whitening agent or light in a luminous wavelength range of the fluorescent whitening agent.

* * * * *